US012456824B2

(12) United States Patent
Shen et al.

(10) Patent No.: US 12,456,824 B2
(45) Date of Patent: Oct. 28, 2025

(54) MULTI-BAND SHARED-APERTURE ANTENNA AND COMMUNICATION DEVICE

(71) Applicant: Huawei Technologies Co., Ltd., Shenzhen (CN)

(72) Inventors: Long Shen, Shanghai (CN); Guanxi Zhang, Shanghai (CN); Xue Bai, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 250 days.

(21) Appl. No.: 18/148,874

(22) Filed: Dec. 30, 2022

(65) Prior Publication Data

US 2023/0137645 A1 May 4, 2023

Related U.S. Application Data

(63) Continuation of application No. PCT/CN2021/104286, filed on Jul. 2, 2021.

(30) Foreign Application Priority Data

Jul. 3, 2020 (CN) ......................... 202021278642.5

(51) Int. Cl.
*H01Q 21/24* (2006.01)
*H01Q 7/00* (2006.01)
(Continued)

(52) U.S. Cl.
CPC ............... *H01Q 21/24* (2013.01); *H01Q 7/00* (2013.01); *H01Q 9/16* (2013.01); *H01Q 19/10* (2013.01); *H01Q 21/0006* (2013.01)

(58) Field of Classification Search
CPC ............ H01Q 21/24; H01Q 7/00; H01Q 9/16; H01Q 19/10; H01Q 21/0006; H01Q 9/44; H01Q 21/062; H01Q 1/521; H01Q 19/108
See application file for complete search history.

(56) References Cited

U.S. PATENT DOCUMENTS

| | | | | |
|---|---|---|---|---|
| 7,283,101 B2 * | 10/2007 | Bisiules | H01Q 21/28 | 343/769 |
| 8,199,063 B2 * | 6/2012 | Moon | H01Q 21/24 | 343/810 |

(Continued)

FOREIGN PATENT DOCUMENTS

| | | |
|---|---|---|
| CN | 201199545 Y | 2/2009 |
| CN | 101548434 A | 9/2009 |

(Continued)

*Primary Examiner* — Dimary S Lopez Cruz
*Assistant Examiner* — Austin M Back
(74) *Attorney, Agent, or Firm* — Slater Matsil, LLP

(57) ABSTRACT

This application provides a multi-band shared-aperture antenna. The multi-band shared-aperture antenna includes a first antenna array, a second antenna array, and a reflection panel, where the first antenna array includes four first dielectric plates perpendicular, two adjacent first dielectric plates are perpendicular to each other, the first antenna array includes four hollowed butterfly dipole units, the dipole unit includes two radiation arms, the two radiation arms are respectively printed on two adjacent first dielectric plates, the radiation arm includes a first part and a second part, a first feeding stub is disposed on the first dielectric plate, the second part has a specified width in a direction perpendicular to the reflection panel, the second antenna array includes a plurality of second dielectric plates, four ring-shaped coils are disposed on any one of the second dielectric plates, and the ring-shaped coil is connected to a second feeding stub.

20 Claims, 28 Drawing Sheets

(51) Int. Cl.

| | |
|---|---|
| ***H01Q 9/16*** | (2006.01) |
| ***H01Q 19/10*** | (2006.01) |
| ***H01Q 21/00*** | (2006.01) |

(56) References Cited

U.S. PATENT DOCUMENTS

| | | | | |
|---|---|---|---|---|
| 9,461,368 | B2 * | 10/2016 | Azulay .................. | H01Q 1/007 |
| 2006/0248565 | A1 * | 11/2006 | Shimp .................... | H04N 7/106<br>725/62 |
| 2010/0097286 | A1 * | 4/2010 | Morrow ................... | H01Q 1/42<br>343/810 |
| 2019/0280391 | A1 * | 9/2019 | Sanjuan Flores ........ | H01Q 1/38 |

FOREIGN PATENT DOCUMENTS

| | | | | |
|---|---|---|---|---|
| CN | 202839949 | U | | 3/2013 |
| CN | 205985359 | U | * | 2/2017 |
| CN | 109994817 | A | | 7/2019 |
| CN | 213366800 | U | | 6/2021 |
| JP | 2017118455 | A | * | 6/2017 |

* cited by examiner

MULTI-BAND SHARED-APERTURE ANTENNA AND COMMUNICATION DEVICE

CROSS-REFERENCE TO RELATED APPLICATIONS

This application is a continuation of International Application No. PCT/CN2021/104286, filed on Jul. 2, 2021, which claims priority to Chinese Patent Application No. 202021278642.5, filed on Jul. 3, 2020. The disclosures of the aforementioned applications are hereby incorporated by reference in their entireties.

TECHNICAL FIELD

This application relates to the communication technologies, and in particular, to a multi-band shared-aperture antenna and a communication device.

BACKGROUND

With rapid development of a fifth-generation (5G) mobile communication system, a base station antenna needs to meet requirements of a plurality of frequency bands simultaneously. Currently, a manner in which a high-frequency antenna and a low-frequency antenna are coaxially nested is mainly used, so that antennas of different frequency bands are deployed in a same base station space to operate without affecting each other. A newly added 5G-band antenna cannot be directly added to an existing antenna structure due to a limited antenna aperture. This is because a conventional coaxially nested structure enables a low-frequency antenna to keep away from a high-frequency antenna as much as possible. In this case, coupling between the low-frequency antenna and the high-frequency antenna is reduced, and distortion of a high-frequency antenna pattern is avoided. However, this structure requires a large antenna frequency, which is not suitable for a coexistence design of the 5G-band antenna and 2G-band, 3G-band, and 4G-band antennas.

An advanced design system (ADS) technology is a new technology that can effectively reduce coupling between antenna array units. When a multi-band shared-aperture antenna is designed, an ADS structure is used in an antenna array, to effectively reduce coupling between antenna units.

However, a specific space needs to be added for the foregoing antenna structure based on a current antenna aperture, to place an ADS. Consequently, a space occupied by an entire array antenna is enlarged, and independent intra-band decoupling cannot be implemented for antennas of more than two frequency bands.

SUMMARY

This application provides a multi-band shared-aperture antenna and a communication device, to implement an effect that a high-frequency antenna array and a low-frequency antenna array coexist without a mutual influence of standing waves.

According to a first aspect, this application provides a multi-band shared-aperture antenna, including a first antenna array, a second antenna array, and a reflection panel, where both the first antenna array and the second antenna array are disposed above the reflection panel, a frequency band of the first antenna array is lower than a frequency band of the second antenna array, and a highest part of the first antenna array is higher than a highest part of the second antenna array; the first antenna array includes four first dielectric plates, all the four first dielectric plates are perpendicular to the reflection panel, the four first dielectric plates enclose a hollowed structure, two adjacent first dielectric plates are perpendicular to each other, the first antenna array includes four hollowed butterfly dipole units, any one of the dipole units includes two radiation arms, the two radiation arms are respectively printed on two adjacent first dielectric plates, an included angle between the two radiation arms is 90°, any one of the radiation arms includes a first part perpendicular to the reflection panel and a second part parallel to the reflection panel, the first part is connected to the second part, a first feeding stub is disposed at a position that is on the first dielectric plate and on which the first part is printed, the first feeding stub and the first part are respectively located on two surfaces of the first dielectric plate, the first feeding stub is connected to the reflection panel, and the second part has a specified width in a direction perpendicular to the reflection panel; and the second antenna array includes a plurality of second dielectric plates, all the plurality of second dielectric plates are parallel to the reflection panel, four ring-shaped coils are disposed on any one of the second dielectric plates, any one of the ring-shaped coils is connected to a second feeding stub, and the second feeding stub is connected to the reflection panel.

The multi-band shared-aperture antenna provided in this embodiment includes a low-frequency antenna array (the first antenna array) and a high-frequency antenna array (the second antenna array). Therefore, an effect that the high-frequency antenna array and the low-frequency antenna array coexist is implemented without a mutual influence of standing waves.

In a possible implementation, two dipole units on a diagonal line in the first antenna array have a same polarization direction.

In a possible implementation, two adjacent dipole units in the first antenna array form two polarization directions of ±45°.

In a possible implementation, the second part presents an unclosed ring-shaped structure.

In a possible implementation, a lumped first resonant circuit is disposed on the second part; and the first resonant circuit includes two parallel slots disposed on the second part, a capacitor and an inductor are disposed on one slot, and a capacitor is disposed on the other slot.

In this embodiment, the lumped resonant circuit is added, the slots are disposed at a plurality of positions on the second part that is of the radiation arm of the first antenna array and that is parallel to the reflection panel, and the capacitors and the inductor are embedded in the slots to form the resonant circuit. The resonant circuit is a series resonant circuit formed by connecting one capacitor-inductor parallel resonant circuit to one capacitor in series. In a low frequency band, the resonant circuit performs series resonance, which is equivalent to a short-circuit state, so that the resonant circuit can maintain complete performance of a low-frequency antenna. In a high frequency band, the resonant circuit performs parallel resonance, which is equivalent to an open-circuit state. In this case, for the high-frequency antenna array, the low-frequency antenna array is equivalent to an interrupted non-resonant structure. Therefore, an impact of the low-frequency antenna array on the high-frequency antenna array can be further reduced, thereby implementing an effect of shared-aperture coexistence of the high-frequency antenna array and the low-frequency antenna array. In addition, in the high frequency band, the low-frequency antenna array is equivalent to interrupted distributed metal sheets, and the distributed metal sheets are equivalent to a decoupling surface, which reduces coupling between high-frequency antenna arrays. Therefore, in this case, the low-frequency antenna array may also be used as a decoupling structure of the high-frequency antenna array, so that functions of coexistence of a high-frequency antenna and the low-frequency antenna and decoupling between high-frequency antennas can be implemented simultaneously.

In a possible implementation, a distributed second resonant circuit is disposed on the second part; the second resonant circuit includes an interdigital capacitor and an inductor, and the interdigital capacitor is formed by intersecting two comb-shaped microstrips; and the inductor is formed by bending one microstrip.

In this embodiment, the distributed resonant circuit is added, the resonant circuit is disposed at a plurality of positions on the second part that is of the radiation arm of the first antenna array and that is parallel to the reflection panel, the capacitors in the lumped resonant circuit in Embodiment 2 are replaced with the distributed interdigital capacitor, and the inductor in the lumped resonant circuit is replaced with the distributed long-line inductor. These distributed elements are easier to be machined. The resonant circuit is a series resonant circuit formed by connecting one capacitor-inductor parallel resonant circuit to one capacitor in series. In a low frequency band, the resonant circuit performs series resonance, which is equivalent to a short-circuit state, so that the resonant circuit can maintain complete performance of a low-frequency antenna. In a high frequency band, the resonant circuit performs parallel resonance, which is equivalent to an open-circuit state. In this case, for the high-frequency antenna array, the low-frequency antenna array is equivalent to an interrupted non-resonant structure. Therefore, an impact of the low-frequency antenna array on the high-frequency antenna array can be further reduced, thereby implementing an effect of shared-aperture coexistence of the high-frequency antenna array and the low-frequency antenna array. In addition, in the high frequency band, the low-frequency antenna array is equivalent to interrupted distributed metal sheets, and the distributed metal sheets are equivalent to a decoupling surface, which reduces coupling between high-frequency antenna arrays. Therefore, in this case, the low-frequency antenna array may also be used as a decoupling structure of the high-frequency antenna array, so that functions of coexistence of a high-frequency antenna and the low-frequency antenna and decoupling between high-frequency antennas can be implemented simultaneously.

According to a second aspect, this application provides a multi-band shared-aperture antenna, including a first antenna array, a second antenna array, and a reflection panel, where both the first antenna array and the second antenna array are disposed above the reflection panel by using a plurality of pillars, and a frequency band of the first antenna array is lower than a frequency band of the second antenna array; the first antenna array includes a plurality of first dielectric plates, all the plurality of first dielectric plates are parallel to the reflection panel, four ring-shaped coils evenly distributed around a central point of the first dielectric plate are disposed on any one of the first dielectric plates, two ring-shaped coils that are disposed opposite to each other form one dipole unit, and the dipole unit is connected to one Y-type feeding structure; the second antenna array includes a plurality of second dielectric plates and a plurality of third dielectric plates, all the plurality of second dielectric plates and the plurality of third dielectric plates are parallel to the reflection panel, the plurality of second dielectric plates are in a one-to-one correspondence with the plurality of third dielectric plates, the second dielectric plate is located above a corresponding third dielectric plate, a first through hole and a metal layer surrounding the first through hole are disposed at a center position of any one of the second dielectric plates, and a second through hole and a plurality of J-type feeding structures evenly distributed around the second through hole are disposed at a center position of any one of the third dielectric plates; the plurality of J-type feeding structures are connected to a feedback plate through the second through hole, and the Y-type feeding structure is connected to the reflection panel through the first through hole and the second through hole; and the plurality of first dielectric plates are located above the plurality of second dielectric plates.

The multi-band shared-aperture antenna provided in this embodiment includes a low-frequency antenna array (the first antenna array) and a high-frequency antenna array (the second antenna array). Therefore, an effect that the high-frequency antenna array and the low-frequency antenna array coexist is implemented without a mutual influence of standing waves.

In a possible implementation, a quantity of the plurality of J-type feeding structures is four.

In a possible implementation, a connection line between a central point of the first through hole and a central point of the second through hole is perpendicular to the reflection panel.

In a possible implementation, the antenna further includes a third antenna array, the third antenna array is disposed above the reflection panel, a frequency band of the third antenna array is lower than the frequency band of the first antenna array, and a highest part of the third antenna array is higher than a highest part of the first antenna array; and the third antenna array includes four third dielectric plates, all the four third dielectric plates are perpendicular to the reflection panel, the four third dielectric plates enclose a hollowed structure, two adjacent third dielectric plates are perpendicular to each other, the third antenna array includes four hollowed butterfly dipole units, any one of the dipole units includes two radiation arms, the two radiation arms are respectively printed on two adjacent third dielectric plates, an included angle between the two radiation arms is 90°, any one of the radiation arms includes a first part perpendicular to the reflection panel and a second part parallel to the reflection panel, the first part is connected to the second part, a first feeding stub is disposed at a position that is on the third dielectric plate and on which the first part is printed, the first feeding stub and the first part are respectively located on two surfaces of the third dielectric plate, the first feeding stub is connected to the reflection panel, and the second part has a specified width in a direction perpendicular to the reflection panel.

The shared-aperture antenna in this embodiment supports a high frequency band, a medium frequency band, and a low frequency band. The entire antenna uses a layered structure, a low-frequency antenna at an upper layer is similar to a first array antenna that covers a frequency band of 690 MHz to 960 MHz in Embodiments 1 to 3, and is embedded in a gap between a medium-frequency antenna (a first array antenna in Embodiment 4) and a high-frequency antenna (a second array antenna in Embodiment 4) array at lower layers by using a support structure. The low-frequency antenna uses a distributed capacitor-inductor wave transmission structure, to generate series resonance for a low-frequency signal to form a short circuit for normal operation, and to generate parallel resonance in a medium/high frequency band to form an open circuit, thereby implementing a wave transmission function required by the low-frequency antenna for a medium/high-frequency signal, freely radiating the medium/high-frequency signal, and minimizing an impact of the low-frequency antenna on an antenna pattern and a gain of the medium/high-frequency antenna. In addition, an ADS decoupling function of the low-frequency antenna at the upper layer can be used to uniformly decouple the medium-frequency antenna array and the high-frequency antenna array at the lower layers. This minimizes coupling between antenna units at the lower layers and avoids distortion of the antenna pattern. The medium-frequency array and the high-frequency array at the lower layers use an upper-lower layer coaxial structure. The medium-frequency antenna at an upper layer covers a frequency band of 1.71 GHz to 2.69 GHz, and the high-frequency antenna at a lower layer covers a frequency band of 3.3 GHz to 3.8 GHz. The high-frequency antenna is designed as an FSS, so that the high-frequency signal can be normally radiated. In this way, distortion that is of the antenna pattern of the high-frequency antenna and that is caused by the medium-frequency antenna is minimized. Finally, in an overall structure in which the low-frequency antenna and both of the medium-frequency antenna and the high-frequency antenna are embedded in layers, and the medium-frequency antenna and the high-frequency antenna are coaxially layered, a capacitor-inductor structure wave transmission technology, an ADS decoupling technology, and an FSS wave transmission technology are separately used to implement wave transmission and decoupling functions of the three-band shared-aperture array antenna, to obtain excellent antenna pattern performance and meet a gain requirement.

In a possible implementation, two dipole units on a diagonal line in the third antenna array have a same polarization direction.

In a possible implementation, two adjacent dipole units in the third antenna array form two polarization directions of ±45°.

In a possible implementation, the second part presents an unclosed ring-shaped structure.

In a possible implementation, a lumped first resonant circuit is disposed on the second part; and the first resonant circuit includes two parallel slots disposed on the second part, a capacitor and an inductor are disposed on one slot, and a capacitor is disposed on the other slot.

In a possible implementation, a distributed second resonant circuit is disposed on the second part; the second resonant circuit includes an interdigital capacitor and an inductor, and the interdigital capacitor is formed by intersecting two comb-shaped microstrips; and the inductor is formed by bending one microstrip.

According to a third aspect, this application provides a communication device, including the multi-band shared-aperture antenna according to any one of the first and second aspects.

DETAILED DESCRIPTION OF ILLUSTRATIVE EMBODIMENTS

To make the objectives, technical solutions, and advantages of this application clearer, the following clearly describes the technical solutions in this application with reference to the accompanying drawings in this application. It is clear that the described embodiments are merely a part rather than all of embodiments of this application. All other embodiments obtained by a person of ordinary skill in the art based on embodiments of this application without creative efforts shall fall within the protection scope of this application.

The terms "first", "second", and the like in the specification embodiments, claims, and accompanying drawings of this application are merely used for distinguishing descriptions, and cannot be understood as indicating or implying relative importance, or as indicating or implying a sequence. In addition, the terms "include", "have", and any variation thereof are intended to cover non-exclusive inclusions, for example, a series of steps or units are included. Methods, systems, products, or devices are not limited to those clearly listed steps or units, and other steps or units that are not clearly listed or that are inherent to these processes, methods, products, or devices may be included.

It should be understood that, in this application, "at least one (item)" refers to one or more, and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between associated objects. The term "at least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

Figure 1A:
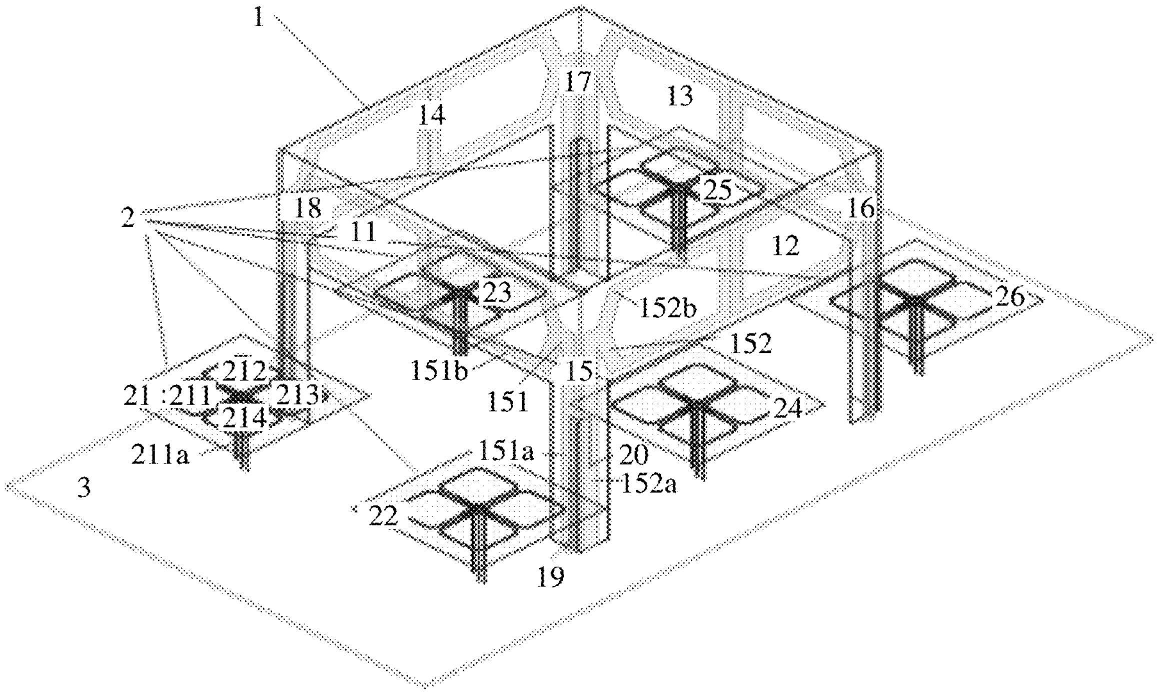
FIG. 1A to FIG. 1C are schematic diagrams of structures of a multi-band shared-aperture antenna according to Embodiment 1 of this application.
Figure 1B:
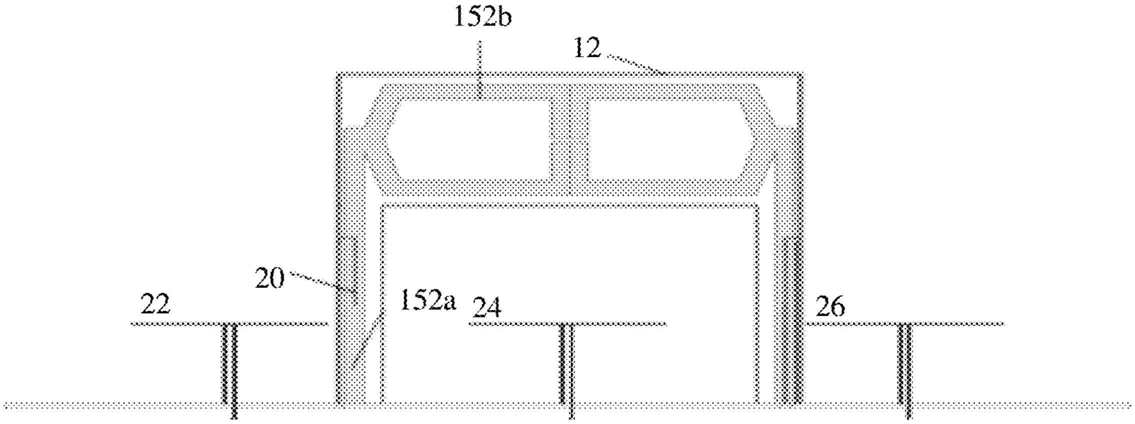
Figure 1C:
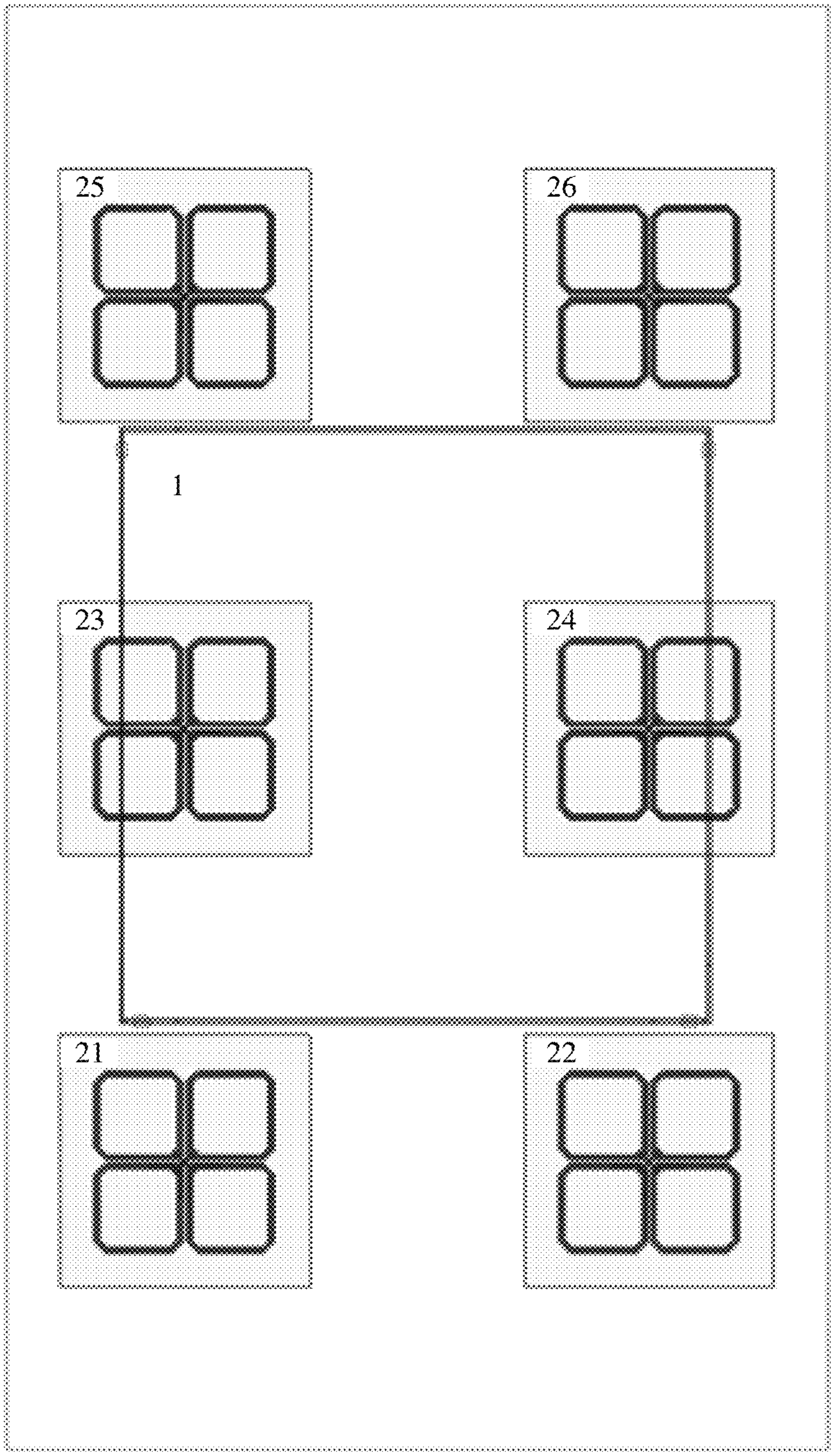

FIG. 1A to FIG. 1C are schematic diagrams of structures of a multi-band shared-aperture antenna according to Embodiment 1 of this application. As shown in FIG. 1A, FIG. 1B, and FIG. 1C, the antenna in this embodiment may include a first antenna array 1, a second antenna array 2, and a reflection panel 3. Both the first antenna array 1 and the second antenna array 2 are disposed above the reflection panel 3, a frequency band of the first antenna array 1 is lower than a frequency band of the second antenna array 2, and a highest part of the first antenna array 1 is higher than a highest part of the second antenna array 2.

The first antenna array 1 includes four first dielectric plates 11 to 14, and all the four first dielectric plates 11 to 14 are perpendicular to the reflection panel 3. The four first dielectric plates 11 to 14 enclose a hollowed structure, and two adjacent first dielectric plates are perpendicular to each other. For example, the first dielectric plate 11 and the second dielectric plate 12 are perpendicular to each other, the second dielectric plate 12 and the third dielectric plate 13 are perpendicular to each other, the third dielectric plate 13 and the fourth dielectric plate 14 are perpendicular to each other, and the fourth dielectric plate 14 and the first dielectric plate 11 are perpendicular to each other.

Figure 2:
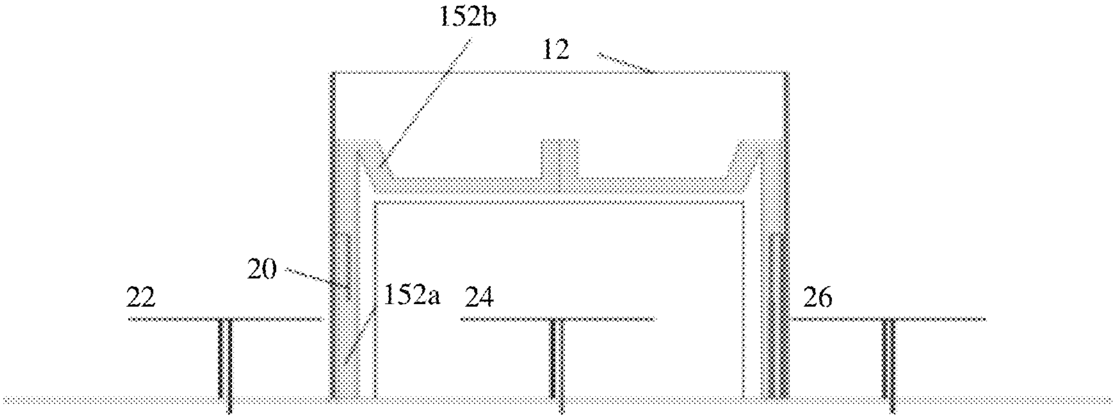
FIG. 2 is a schematic diagram of another example structure of a second part of a radiation arm.

The first antenna array 1 includes four hollowed butterfly dipole units 15 to 18, where any one of the dipole units, for example, the dipole unit 15, includes two radiation arms 151 and 152, and the two radiation arms 151 and 152 are respectively printed on two adjacent first dielectric plates, for example, the radiation arm 151 is printed on the first dielectric plate 11, and the radiation arm 152 is printed on the first dielectric plate 12. Because two adjacent first dielectric plates are perpendicular to each other, an included angle between the radiation arms printed on the two adjacent first dielectric plates is 90°, for example, an included angle between the radiation arm 151 and the radiation arm 152 is 90°. Two radiation arms located on a same first dielectric plate are close to each other, and may play a role of broadening a bandwidth. The radiation arm 151 includes a first part 151*a* perpendicular to the reflection panel and a second part 151*b* parallel to the reflection panel, and the first part 151*a* is connected to the second part 151*b*. A first feeding stub 19 is disposed at a position that is on the first dielectric plate 11 and on which the first part 151*a* is printed, the first feeding stub 19 and the first part 151*a* are respectively located on two surfaces of the first dielectric plate 11, the first feeding stub 19 is connected to the reflection panel 3, and the first feeding stub 19 may use, for example, a microstrip balun. The second part 151*b* has a specified width in a direction perpendicular to the reflection panel 3. The radiation arm 152 includes a first part 152*a* perpendicular to the reflection panel and a second part 152*b* parallel to the reflection panel, and the first part 152*a* is connected to the second part 152*b*. A first feeding stub 20 is disposed at a position that is on the first dielectric plate 12 and on which the first part 152*a* is printed, the first feeding stub 20 and the first part 152*a* are respectively located on two surfaces of the first dielectric plate 12, and the first feeding stub 20 is connected to the reflection panel 3. The second part may present an unclosed ring-shaped structure. As shown in FIG. 1B, the second part 151*b* presents a ring-shaped structure that is symmetrical from top to bottom, and one slot is disposed at a position of a symmetric axis to form an unclosed structure. FIG. 2 is a schematic diagram of another example structure of the second part of the radiation arm. As shown in FIG. 2, the second part 151*b* has only a lower part compared with the structure shown in FIG. 1B. That is, a structure of the second part of the radiation arm may use an unclosed ring-shaped structure with only one slot, or may use an open semi-ring structure. The second part 151*b* has a specified width in a direction perpendicular to the reflection panel 3, that is, the second part 151*b* cannot be in a linear state, and needs to have a specific width, to meet a radiation requirement of the antenna, so that an impact of a low-frequency antenna array (the first antenna array 1) on an antenna pattern and a gain of a high-frequency antenna array (the second antenna array 2) is minimized, thereby implementing an effect that a high-frequency antenna and a low-frequency antenna operate by sharing an aperture.

Two dipole units on a diagonal line in the first antenna array 1 may have a same polarization direction, and two adjacent dipole units form two polarization directions of ±45°. For example, the dipole unit 15 is adjacent to the dipole unit 16, and polarization directions of the dipole unit 15 and the dipole unit 16 are respectively ±45°. The dipole unit 16 is adjacent to the dipole unit 17, and polarization directions of the dipole unit 16 and the dipole unit 17 are respectively ±45°. The dipole unit 17 is adjacent to the dipole unit 18, and polarization directions of the dipole unit 17 and the dipole unit 18 are respectively ±45°. The dipole unit 18 is adjacent to the dipole unit 15, and the polarization directions of the dipole unit 18 and the dipole unit 15 are respectively ±45°. It can be learned that the two dipole units 15 and 17 that are located on a diagonal line of the hollowed structure have a same polarization direction, and the two dipole units 16 and 18 that are located on the other diagonal line of the hollowed structure have a same polarization direction.

It should be noted that structures of the dipole units 16 to 18 in the first antenna array 1 are the same as a structure of the dipole unit 15. For details, refer to the foregoing descriptions about the dipole unit 15. Details are not described herein again.

The second antenna array 2 includes six second dielectric plates 21 to 26, and all the six second dielectric plates 21 to 26 are parallel to the reflection panel 3. Four ring-shaped coils 211 to 214 are disposed on any one of the second dielectric plates, for example, the second dielectric plate 21, where the ring-shaped coils 211 to 214 are separately connected to one second feeding stub, for example, the ring-shaped coil 211 is connected to one second feeding stub 211*a*. The second feeding stub (for example, the second feeding stub 211*a*) is connected to the reflection panel 3. It should be noted that a quantity of second dielectric plates included in the second antenna array 2 may be set to another value based on an actual requirement. This is not specifically limited in this application.

As shown in FIG. 1C, the first antenna array 1 is disposed at a middle position of the six second dielectric plates of the second antenna array 2, and covers the second dielectric plates 23 and 24 in a top view direction.

It should be noted that, in this application, relative positions of the first antenna array 1 and the second antenna array 2, respective heights of the first antenna array 1 and the second antenna array 2 and a height difference between the heights, and/or a spacing between the second dielectric plates in the second antenna array 2 may be adjusted based on an actual requirement. This is not specifically limited. A quantity of components included in each of the first antenna array 1 and the second antenna array 2 and a specific size of each component may be set based on a horizontal beam width, a vertical beam width, a maximum radiation direction, and a gain requirement of the antenna in an actual application. This is not specifically limited either.

Figure 3:
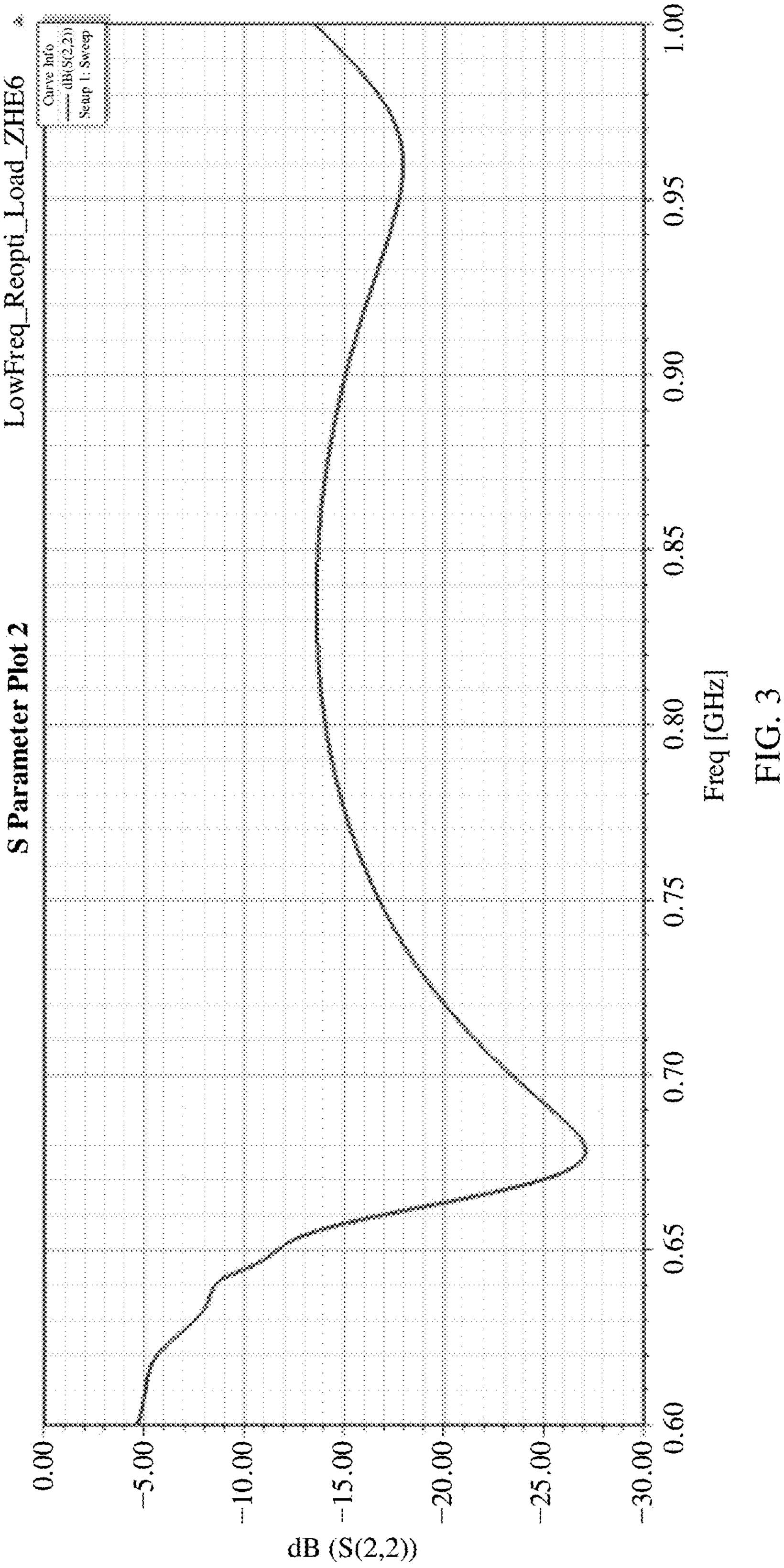
FIG. 3 shows a reflection coefficient curve of low-frequency antenna array (first antenna array) simulation.
Figure 4:
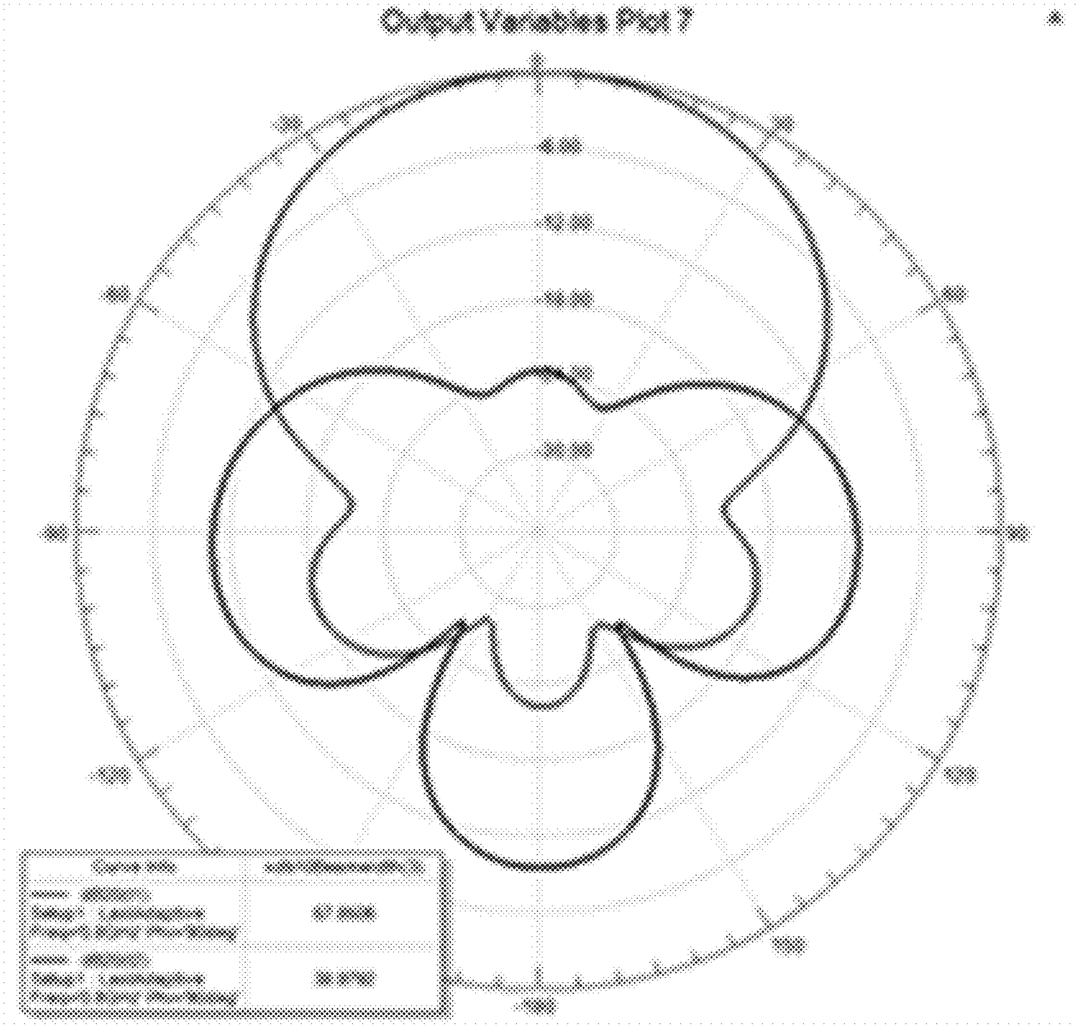
FIG. 4 shows an H-plane antenna pattern of a low-frequency antenna array (a first antenna array) at 800 MHz.
Figure 5:
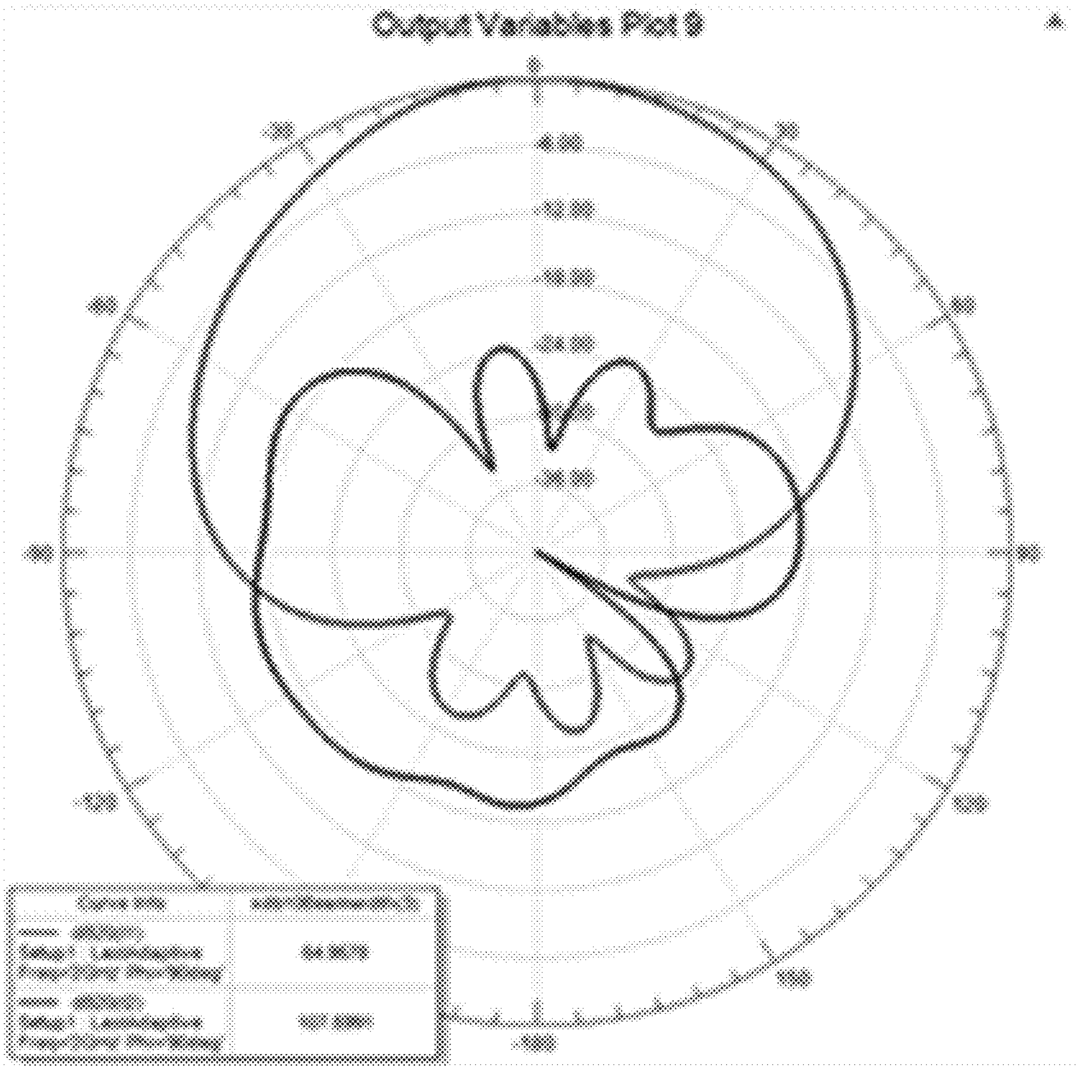
FIG. 5 shows an H-plane antenna pattern of a high-frequency antenna array (a first antenna array) at 2 GHz.

FIG. 3 shows a reflection coefficient curve of low-frequency antenna array (first antenna array) simulation. As shown in FIG. 3, an impedance bandwidth (|Γ|<−10 dB) of the antenna may cover 690 MHz to 960 MHz. FIG. 4 shows an H-plane antenna pattern of a low-frequency antenna array (the first antenna array) at 800 MHz, and FIG. 5 shows an H-plane antenna pattern of a high-frequency antenna array (the first antenna array) at 2 GHz. In FIG. 4 and FIG. 5, a solid line represents a simulated main polarization antenna pattern, and a dotted line represents a simulated cross polarization antenna pattern.

The multi-band shared-aperture antenna provided in this embodiment includes a low-frequency antenna array (the first antenna array) and a high-frequency antenna array (the second antenna array). Therefore, an effect that the high-frequency antenna array and the low-frequency antenna array coexist is implemented without a mutual influence of standing waves.

Figure 6A:
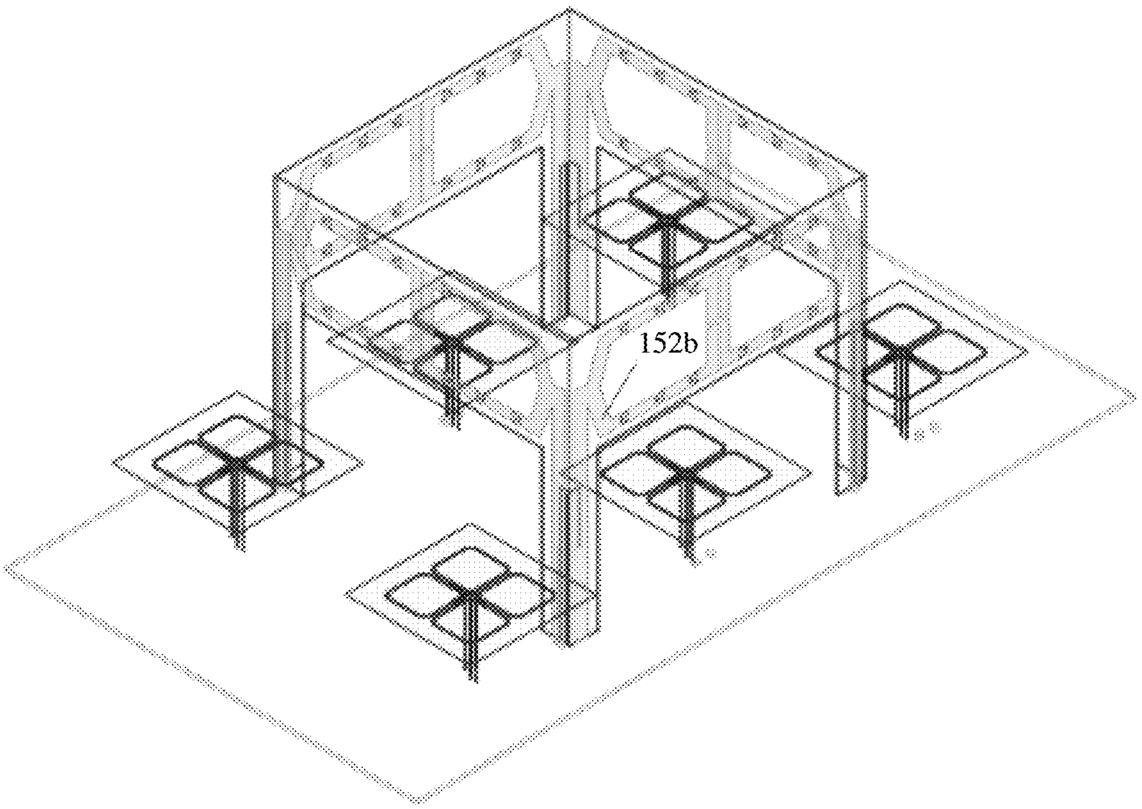
FIG. 6A to FIG. 6C are schematic diagrams of structures of a multi-band shared-aperture antenna according to Embodiment 2 of this application.
Figure 6B:
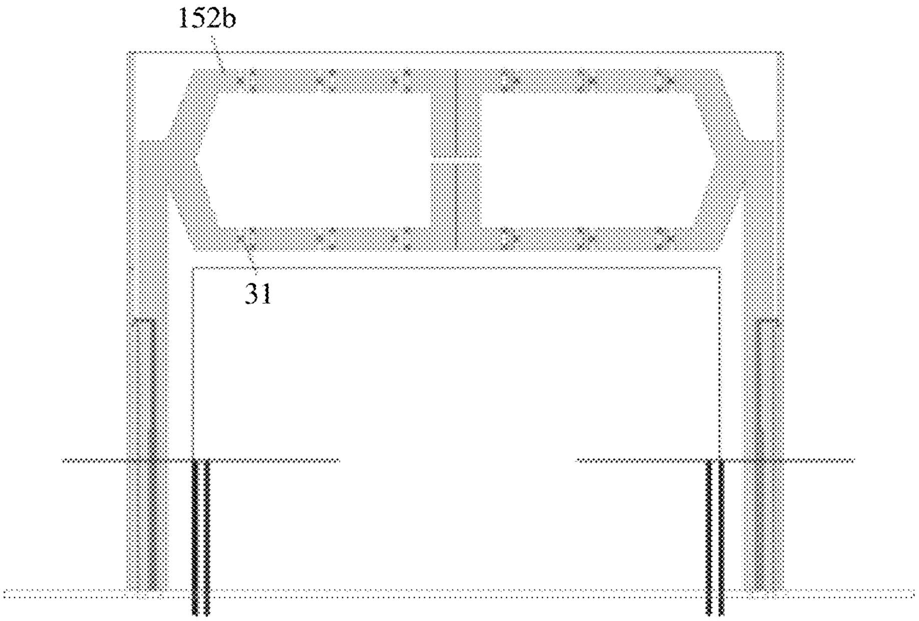
Figure 6C:
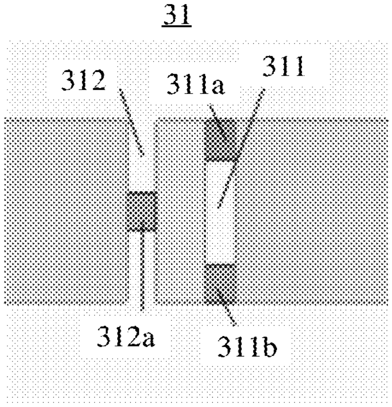

FIG. 6A to FIG. 6C are schematic diagrams of structures of a multi-band shared-aperture antenna according to Embodiment 2 of this application. As shown in FIG. 6A, FIG. 6B, and FIG. 6C, the antenna structure in this embodiment is similar to the antenna structure in Embodiment 1. A difference lies in that a lumped first resonant circuit 31 is disposed on the second part (for example, the second part 152*b*). The first resonant circuit 31 includes two parallel slots 311 and 312 disposed on the second part 152*b*, a capacitor 311*a* and an inductor 311*b* are disposed on one slot 311, and a capacitor 312*a* is disposed on the other slot 312.

It should be noted that structures of the dipole units 16 to 18 in the first antenna array 1 are the same as a structure of the dipole unit 15. For details, refer to the foregoing descriptions about the dipole unit 15. Details are not described herein again.

Figure 7:
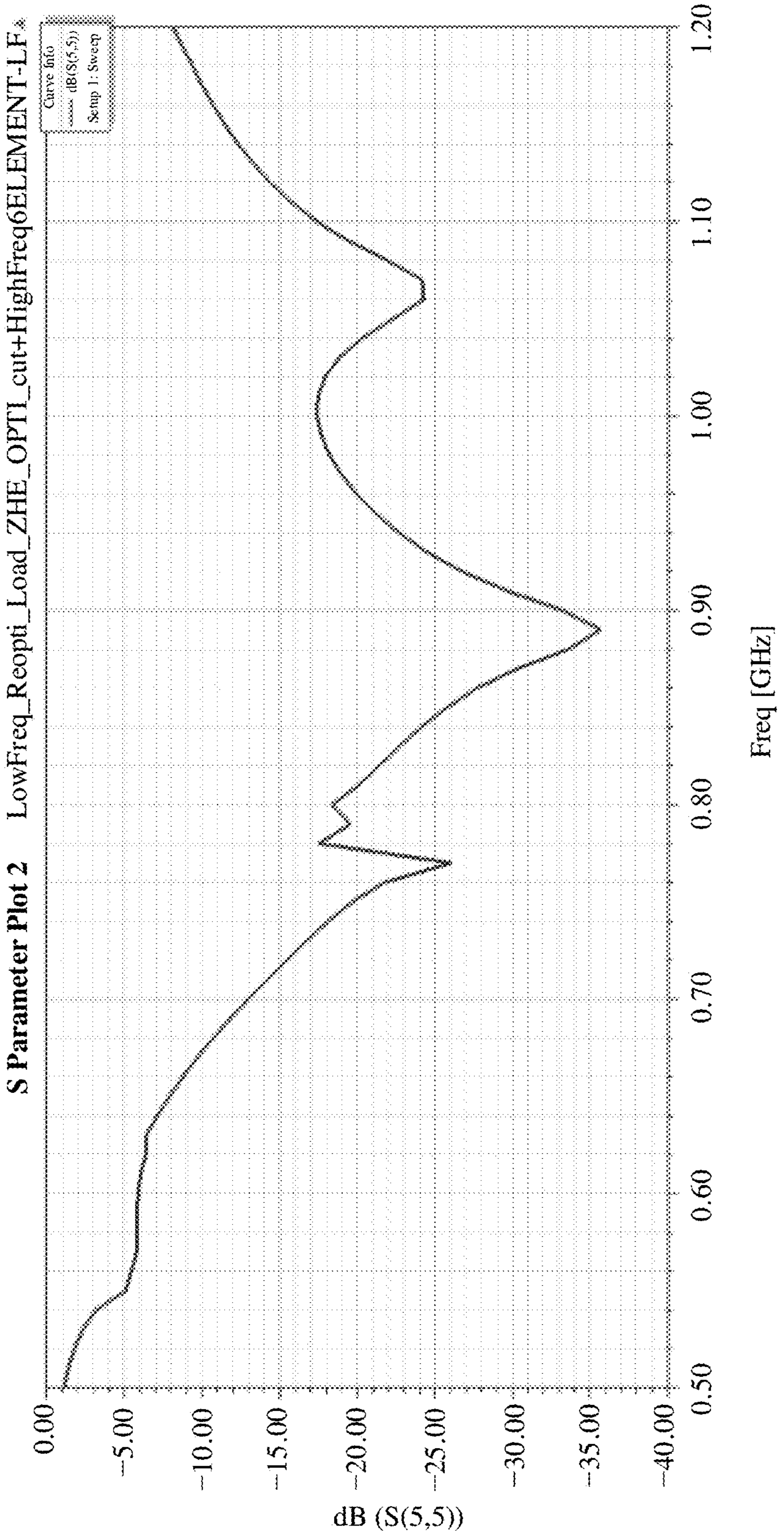
FIG. 7 shows a reflection coefficient curve of low-frequency antenna array (first antenna array) simulation.
Figure 8:
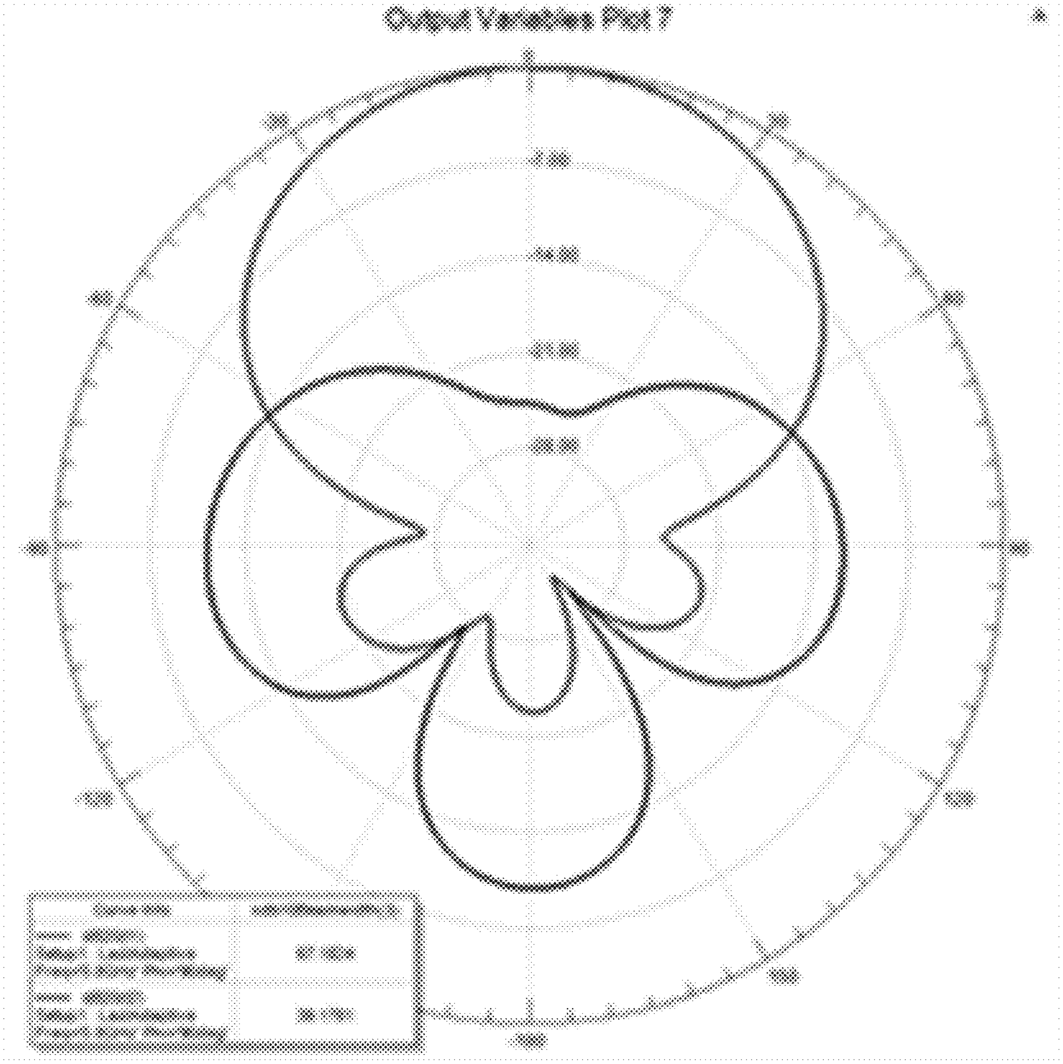
FIG. 8 shows an H-plane antenna pattern of a low-frequency antenna array (a first antenna array) at 800 MHz.
Figure 9:
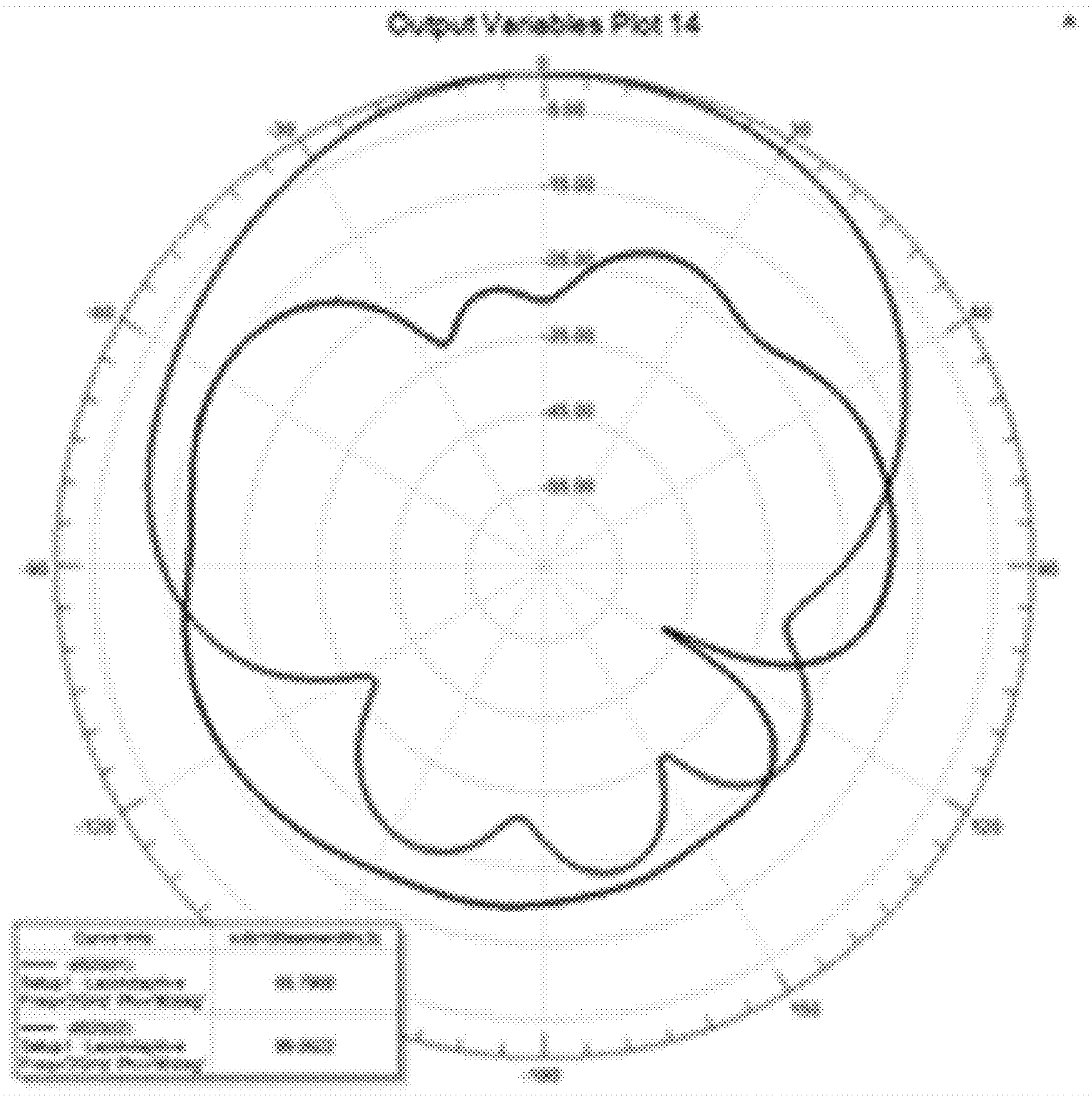
FIG. 9 shows an H-plane antenna pattern of a high-frequency antenna array (a first antenna array) at 2 GHz.

FIG. 7 shows a reflection coefficient curve of low-frequency antenna array (first antenna array) simulation. As shown in FIG. 7, an impedance bandwidth (|Γ|<−10 dB) of the antenna may cover 690 MHz to 960 MHz. FIG. 8 shows an H-plane antenna pattern of a low-frequency antenna array (the first antenna array) at 800 MHz, and FIG. 9 shows an H-plane antenna pattern of a high-frequency antenna array (the first antenna array) at 2 GHz. In FIG. 8 and FIG. 9, a solid line represents a simulated main polarization antenna pattern, and a dotted line represents a simulated cross polarization antenna pattern.

In this embodiment, the lumped resonant circuit is added based on Embodiment 1, the slots are disposed at a plurality of positions on the second part that is of the radiation arm of the first antenna array and that is parallel to the reflection panel, and the capacitors and the inductor are embedded in the slots to form the resonant circuit. The resonant circuit is a series resonant circuit formed by connecting one capacitor-inductor parallel resonant circuit to one capacitor in series. In a low frequency band, the resonant circuit performs series resonance, which is equivalent to a short-circuit state, so that the resonant circuit can maintain complete performance of a low-frequency antenna. In a high frequency band, the resonant circuit performs parallel resonance, which is equivalent to an open-circuit state. In this case, for the high-frequency antenna array, the low-frequency antenna array is equivalent to an interrupted non-resonant structure. Therefore, an impact of the low-frequency antenna array on the high-frequency antenna array can be further reduced, thereby implementing an effect of shared-aperture coexistence of the high-frequency antenna array and the low-frequency antenna array. In addition, in the high frequency band, the low-frequency antenna array is equivalent to interrupted distributed metal sheets, and the distributed metal sheets are equivalent to a decoupling surface, which reduces coupling between high-frequency antenna arrays. Therefore, in this case, the low-frequency antenna array may also be used as a decoupling structure of the high-frequency antenna array, so that functions of coexistence of a high-frequency antenna and the low-frequency antenna and decoupling between high-frequency antennas can be implemented simultaneously.

Figure 10A:
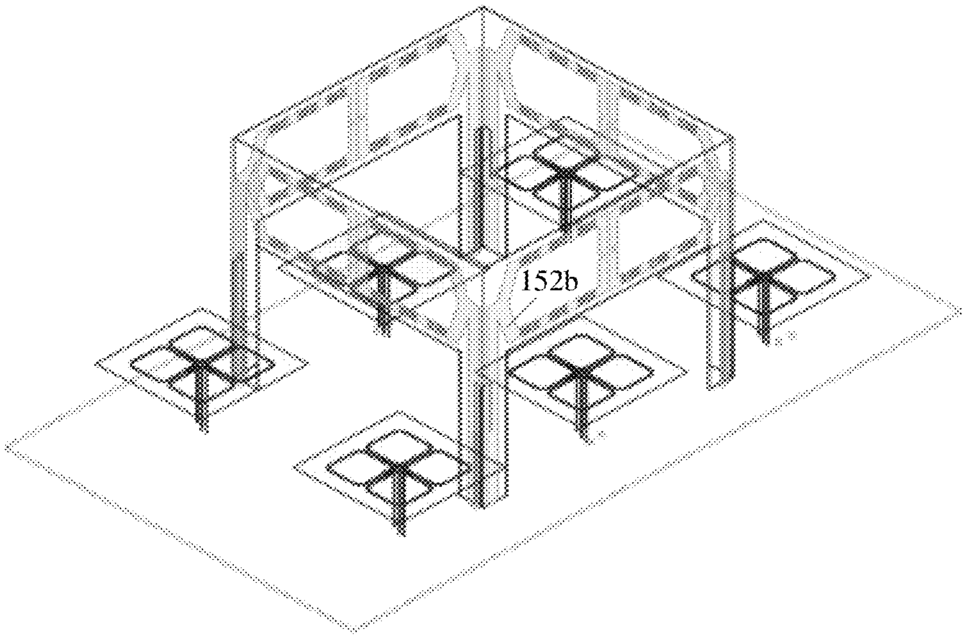
FIG. 10A to FIG. 10C are schematic diagrams of structures of a multi-band shared-aperture antenna according to Embodiment 3 of this application.
Figure 10B:
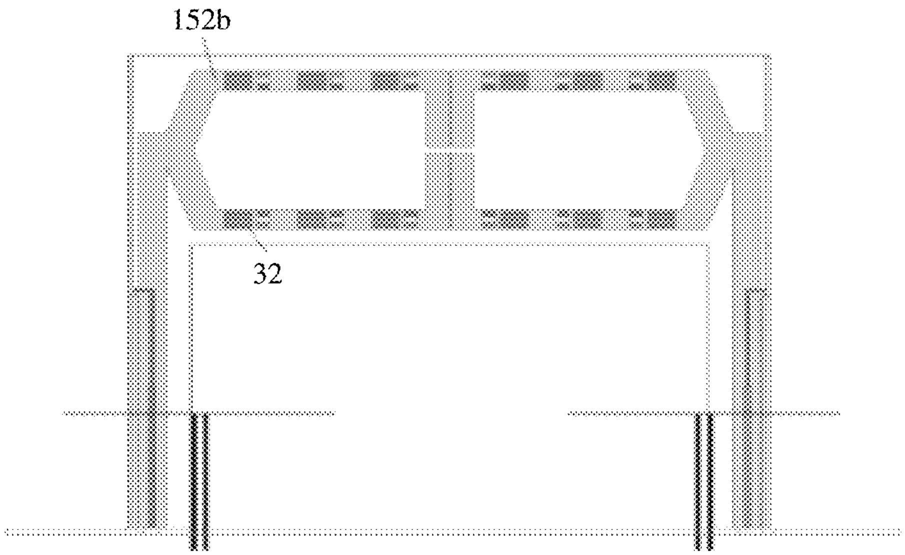
Figure 10C:
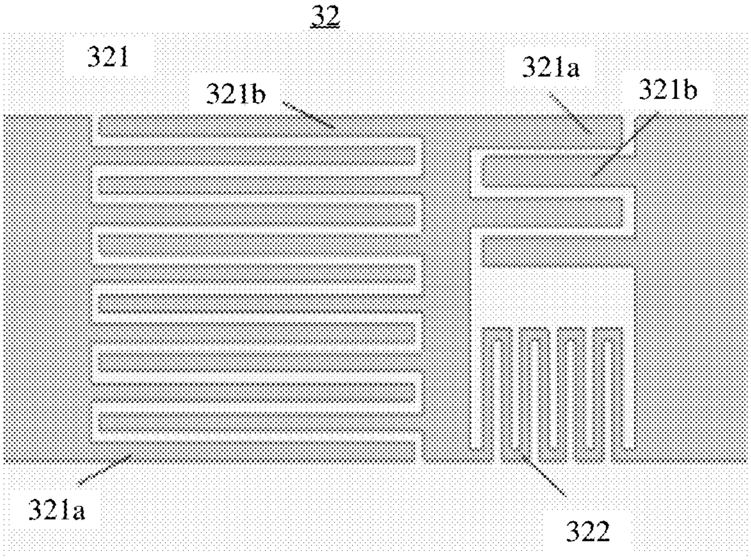

FIG. 10A to FIG. 10C are schematic diagrams of structures of a multi-band shared-aperture antenna according to Embodiment 3 of this application. As shown in FIG. 10A, FIG. 10B, and FIG. 10C, the antenna structure in this embodiment is similar to the antenna structure in Embodiment 1. A difference lies in that a distributed second resonant circuit 32 is disposed on the second part (for example, the second part 152*b*). The second resonant circuit 32 includes an interdigital capacitor 321 and an inductor 322, where the interdigital capacitor 321 is formed by intersecting two comb-shaped microstrips 321*a* and 321*b*, and the inductor 322 is formed by bending one microstrip.

It should be noted that structures of the dipole units 16 to 18 in the first antenna array 1 are the same as a structure of the dipole unit 15. For details, refer to the foregoing descriptions about the dipole unit 15. Details are not described herein again.

Figure 11:
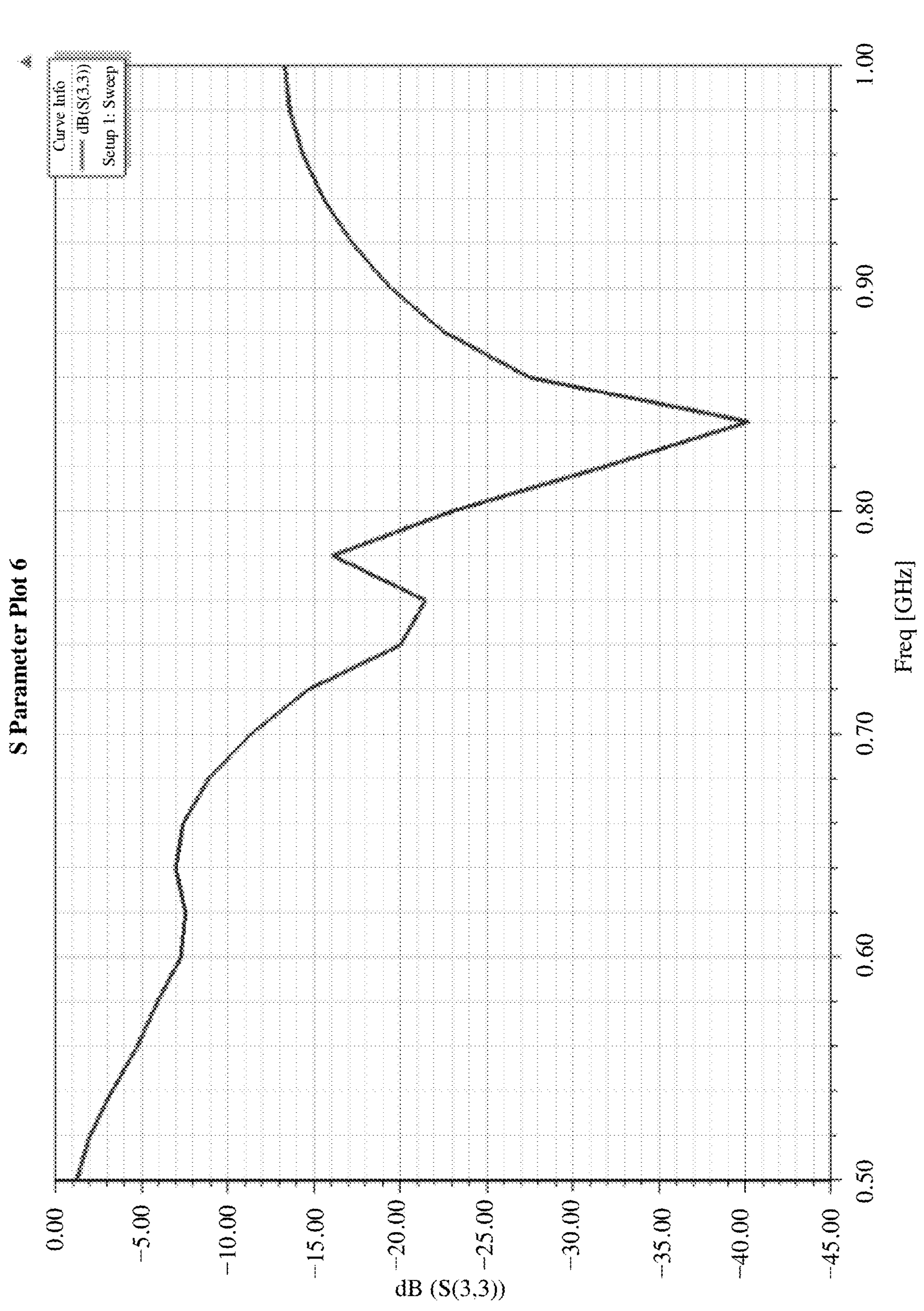
FIG. 11 shows a reflection coefficient curve of low-frequency antenna array (first antenna array) simulation.
Figure 12:
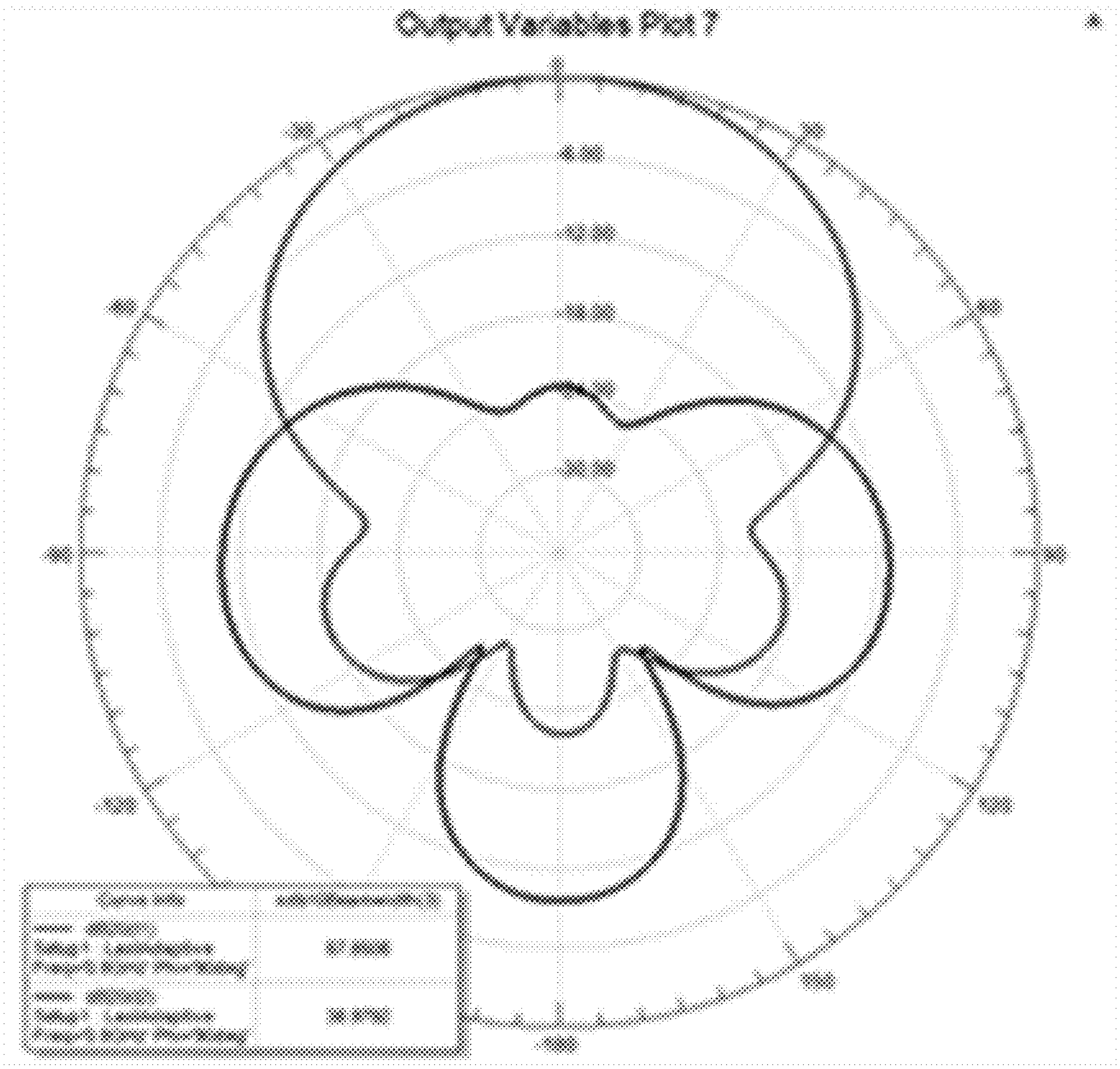
FIG. 12 shows an H-plane antenna pattern of a low-frequency antenna array (a first antenna array) at 800 MHz.
Figure 13:
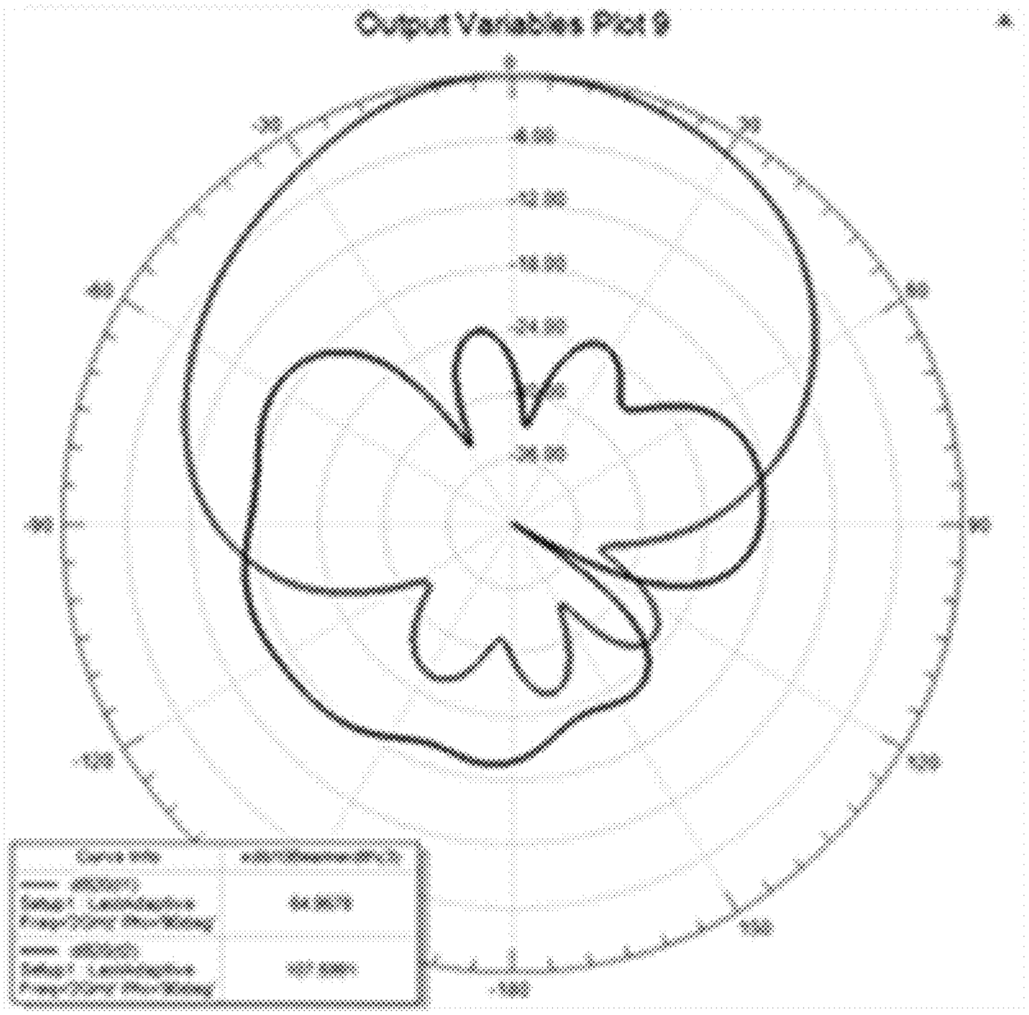
FIG. 13 shows an H-plane antenna pattern of a high-frequency antenna array (a first antenna array) at 2 GHz.

FIG. 11 shows a reflection coefficient curve of low-frequency antenna array (first antenna array) simulation. As shown in FIG. 11, an impedance bandwidth (|Γ|<−10 dB) of the antenna may cover 690 MHz to 960 MHz. FIG. 12 shows an H-plane antenna pattern of a low-frequency antenna array (the first antenna array) at 800 MHz, and FIG. 13 shows an H-plane antenna pattern of a high-frequency antenna array (the first antenna array) at 2 GHz. In FIG. 12 and FIG. 13, a solid line represents a simulated main polarization antenna pattern, and a dotted line represents a simulated cross polarization antenna pattern.

In this embodiment, the distributed resonant circuit is added based on Embodiment 1, the resonant circuit is disposed at a plurality of positions on the second part that is of the radiation arm of the first antenna array and that is parallel to the reflection panel, the capacitors in the lumped resonant circuit in Embodiment 2 are replaced with the distributed interdigital capacitor, and the inductor in the lumped resonant circuit is replaced with the distributed long-line inductor. These distributed elements are easier to be machined. The resonant circuit is a series resonant circuit formed by connecting one capacitor-inductor parallel resonant circuit to one capacitor in series. In a low frequency band, the resonant circuit performs series resonance, which is equivalent to a short-circuit state, so that the resonant circuit can maintain complete performance of a low-frequency antenna. In a high frequency band, the resonant circuit performs parallel resonance, which is equivalent to an open-circuit state. In this case, for the high-frequency antenna array, the low-frequency antenna array is equivalent to an interrupted non-resonant structure. Therefore, an impact of the low-frequency antenna array on the high-frequency antenna array can be further reduced, thereby implementing an effect of shared-aperture coexistence of the high-frequency antenna array and the low-frequency antenna array. In addition, in the high frequency band, the low-frequency antenna array is equivalent to interrupted distributed metal sheets, and the distributed metal sheets are equivalent to a decoupling surface, which reduces coupling between high-frequency antenna arrays. Therefore, in this case, the low-frequency antenna array may also be used as a decoupling structure of the high-frequency antenna array, so that functions of coexistence of a high-frequency antenna and the low-frequency antenna and decoupling between high-frequency antennas can be implemented simultaneously.

FIG. 14A to FIG. 14D are schematic diagrams of structures of a multi-band shared-aperture antenna according to Embodiment 4 of this application. As shown in FIG. 14A to FIG. 14D, the antenna in this embodiment may include a first antenna array 1, a second antenna array 2, and a reflection panel 3. Both the first antenna array 1 and the second antenna array 2 are disposed above the reflection panel 3 by using a plurality of pillars. A frequency band of the first antenna array 1 is lower than a frequency band of the second antenna array 2.

The first antenna array 1 includes a first dielectric plate 11, the first dielectric plate 11 is parallel to the reflection panel 3, and four ring-shaped coils 111 to 114 evenly distributed around a central point 11*a* of the first dielectric plate 11 are disposed on the first dielectric plate 11. Two ring-shaped coils disposed opposite to each other form one dipole unit. For example, the ring-shaped coil 111 and the ring-shaped coil 113 form one dipole unit, and the ring-shaped coil 112 and the ring-shaped coil 114 form one dipole unit. One dipole unit is connected to one Y-type feeding structure. For example, the dipole unit formed by the ring-shaped coil 11 and the ring-shaped coil 113 is connected to one Y-type feeding structure 115, and the dipole unit formed by the ring-shaped coil 112 and the ring-shaped coil 114 is connected to one Y-type feeding structure 116.

The second antenna array 2 includes a second dielectric plate 21 and a third dielectric plate 22. Both the second dielectric plate 21 and the third dielectric plate 22 are parallel to the reflection panel 3. The second dielectric plate 21 and the third dielectric plate 22 are in a one-to-one correspondence, and the second dielectric plate 21 is located above the corresponding third dielectric plate 22. A first through hole 21*a* and a metal layer 211 surrounding the first through hole 21*a* are disposed at a center position of the second dielectric plate 21. A second through hole 22*a* and four J-type feeding structures 221 to 224 evenly distributed around the second through hole 22*a* are disposed at a center position of the third dielectric plate 22. The four J-type feeding structures 221 to 224 are connected to a feedback plate 3 through the second through hole 22*a*. A quantity of J-type feeding structures may be three, four, or the like. This is not specifically limited. A connection line between a central point of the first through hole 21*a* and a central point of the second through hole 22*a* is perpendicular to the reflection panel, that is, the first through hole 21*a* and the second through hole 22*a* are aligned from top to bottom, so that the feeding structures are connected to the reflection panel 3 through the first through hole 21*a* and the second through hole 22*a*.

The Y-type feeding structures 115 and 116 are connected to the reflection panel 3 through the first through hole 21*a* and the second through hole 22*a*. The first dielectric plate 11 is located above the second dielectric plate 21.

Figure 14A:
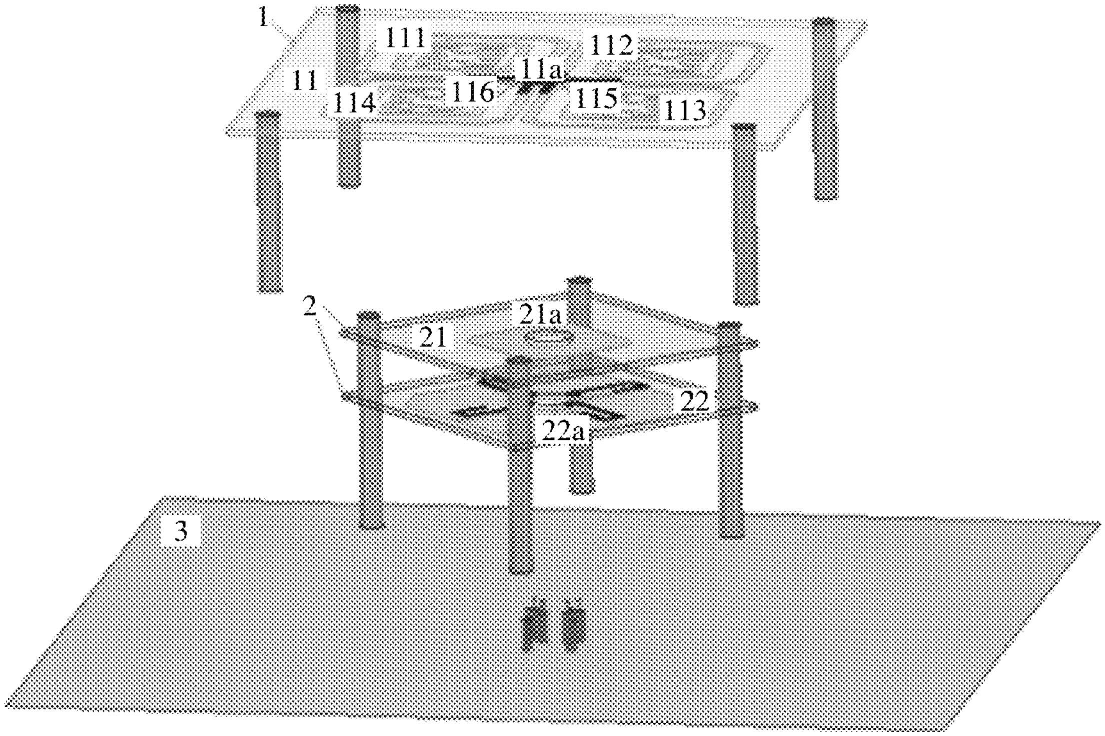
FIG. 14A to FIG. 14D are schematic diagrams of structures of a multi-band shared-aperture antenna according to Embodiment 4 of this application.
Figure 14B:
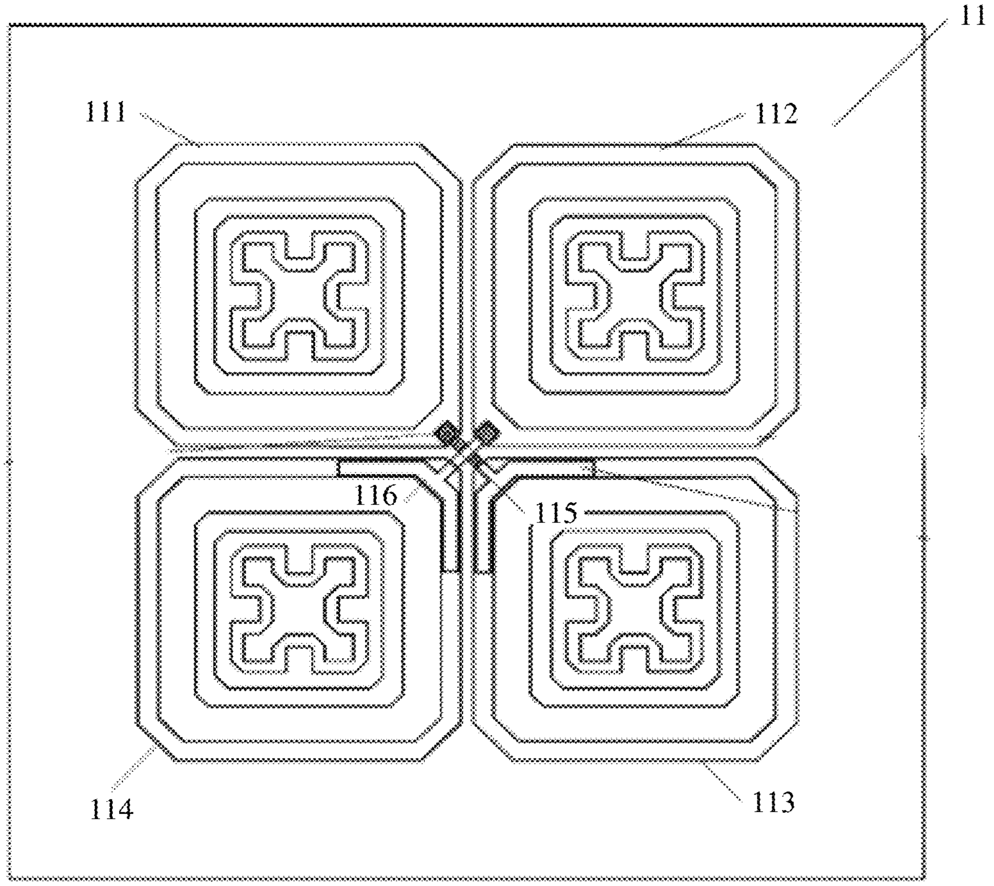
Figure 14C:
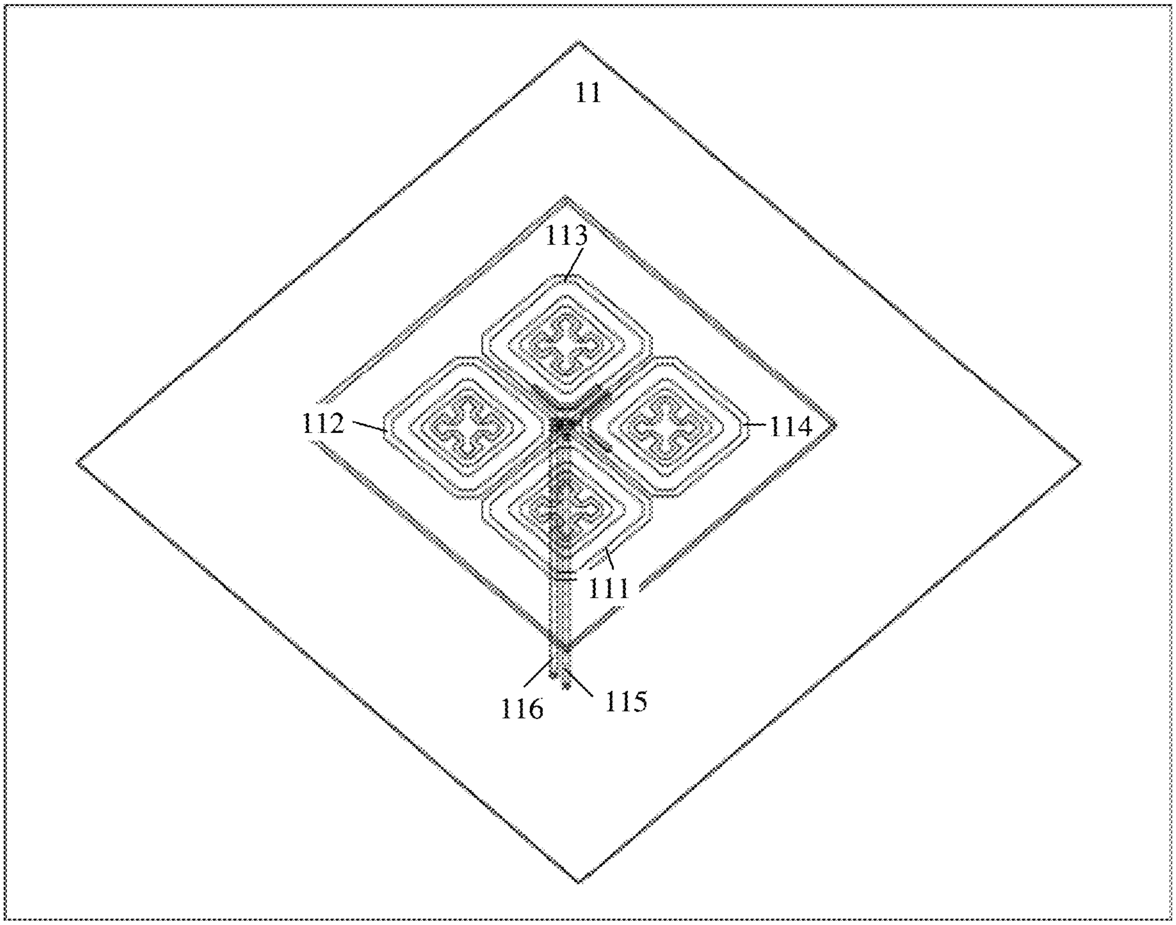
Figure 14D:
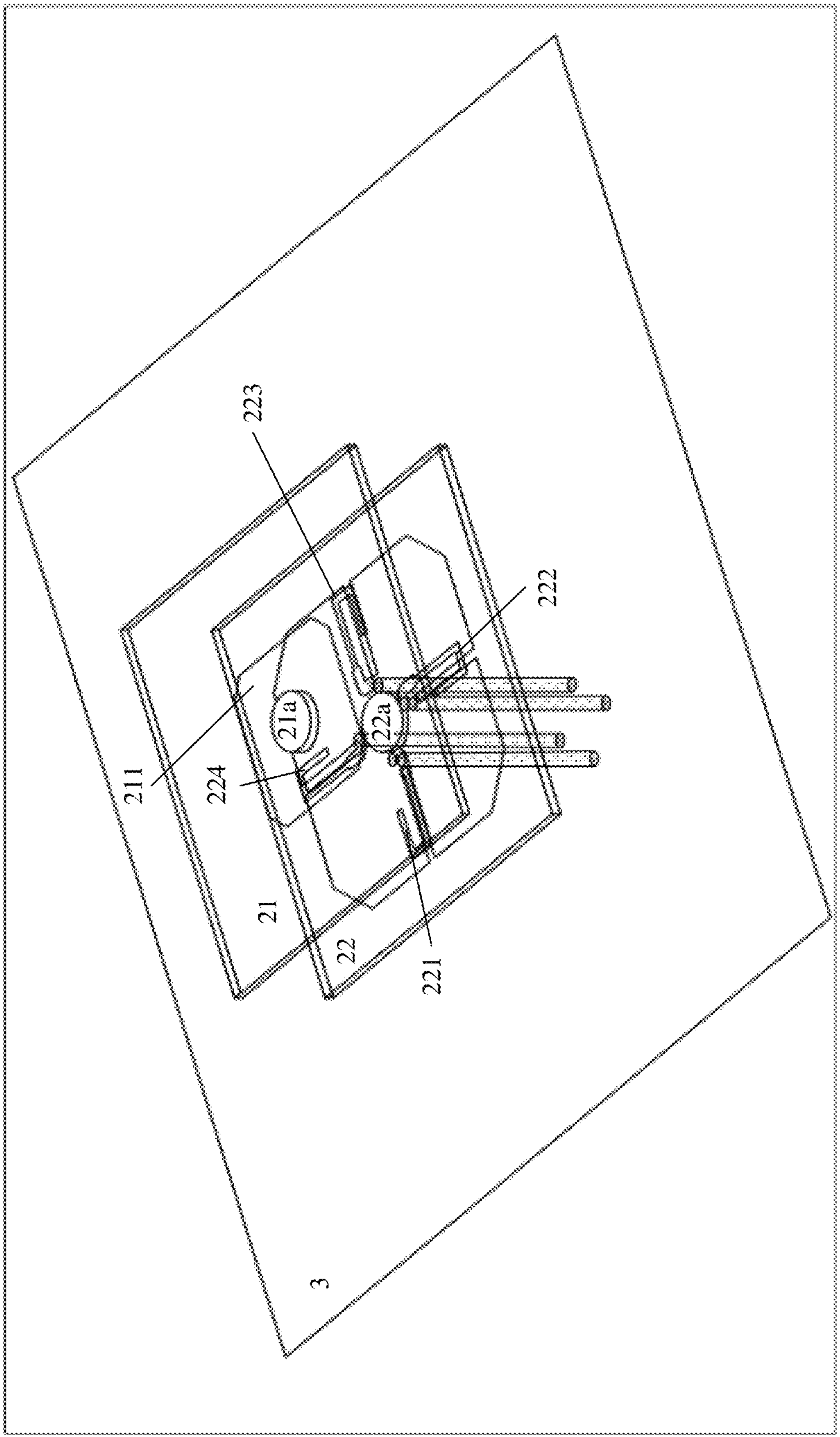

The first antenna array 1 includes two pairs of dipole units and two Y-type feeding structures, and has an operating frequency band of 1.71 GHz to 2.69 GHz. The second antenna array 2 uses a differential feeding laminated patch antenna form, includes one drive patch (the second dielectric plate), one parasitic patch (the third dielectric plate), and four J-type feeding structures, and has operating frequency bands of 3.3 GHz to 3.6 GHz and 4.8 GHz to 5 GHz. Both the first antenna array 1 and the second antenna array 2 use coaxial feeding. To enable a coaxial axis to directly reach the first dielectric plate, a through hole of a same radius is disposed at a center of each of the second dielectric plate and the third dielectric plate, to minimize an impact of the coaxial axis on the second antenna array 2. To prevent the first antenna array 1 from shielding the second antenna array 2, a radiation patch on a surface of the first dielectric plate at an upper layer is designed as a frequency selective surface (frequency selective surface, FSS). As shown in FIG. 14*b*, each dipole arm is designed as a homocentric three-ring structure, an outer square ring is used as a radiation element, and an internally loaded double-ring structure implements a frequency selection function. A circuit of the homocentric three-ring structure may be equivalent to three capacitor-inductor series resonant circuits, and the three series resonant circuits are connected in parallel to respectively correspond to three transmission zeros. It can be learned from basic circuit knowledge that the three series resonant circuits that are connected in parallel may be equivalent to two capacitor-inductor parallel resonant circuits that are connected in parallel, that is, one transmission pole needs to exist in every two transmission zeros. Therefore, two transmission poles exist in the three transmission zeros. In this way, an electromagnetic wave of a corresponding frequency band can normally pass through a low-frequency unit. Positions of the three zeros are respectively controlled by side lengths of three square rings. Therefore, a transmission frequency band may be appropriately adjusted by adjusting a size of the square ring.

Figure 15A:
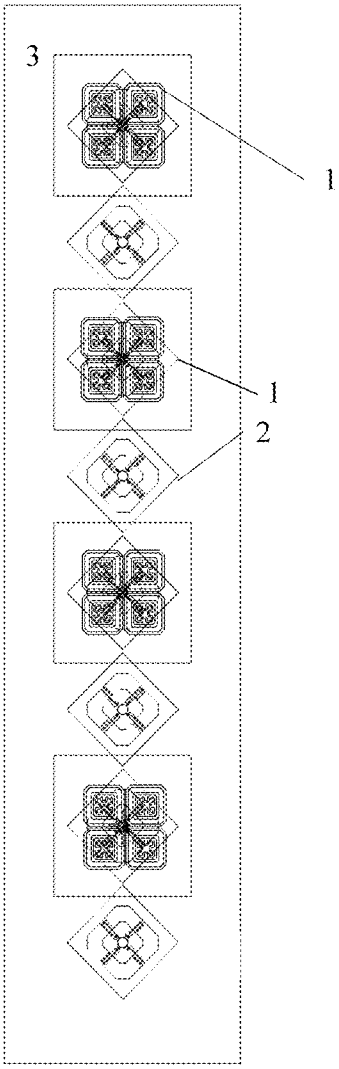
FIG. 15A and FIG. 15B are schematic diagrams of examples of a multi-band shared-aperture antenna array.
Figure 15B:
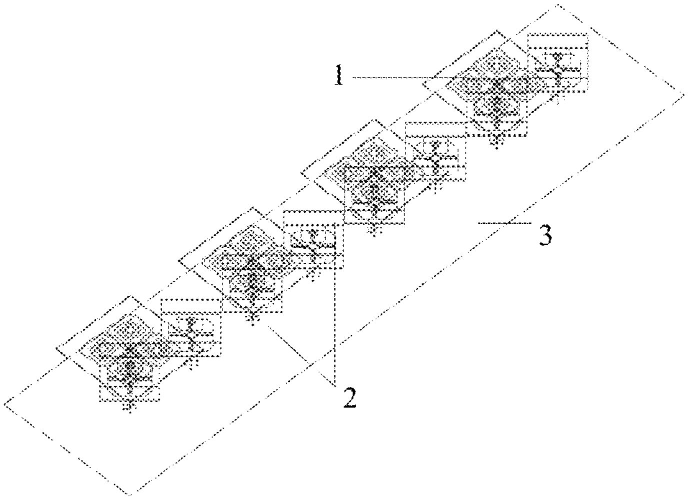

FIG. 15A and FIG. 15B are schematic diagrams of examples of a multi-band shared-aperture antenna array. As shown in FIG. 15A and FIG. 15B, the first antenna array 1 is a 1×4 low-frequency array, and the second antenna array 2 is a 1×8 medium-high-frequency array. The first antenna array 1 and the second antenna array 2 are disposed on the reflection panel 3 in a coaxial layout manner. An odd unit of the second antenna array 2 is placed below one unit of the first antenna array 1, and the first antenna array 1 and the second antenna array 2 use a shared-aperture structure without an additional mounting space. This is equivalent to adding medium-high-frequency antenna units based on an aperture of the original low-frequency antenna array, to ensure normal operation of the low-frequency antenna array and the medium-high-frequency antenna array.

It should be noted that, in this application, relative positions of the first antenna array 1 and the second antenna array 2, respective heights of the first antenna array 1 and the second antenna array 2 and a height difference between the heights, a spacing between the first dielectric plates in the first antenna array 1, a spacing between the second dielectric plates in the second antenna array 2, and/or a spacing between the third dielectric plates in the second antenna array 2 may be adjusted based on an actual requirement. This is not specifically limited. A quantity of components included in each of the first antenna array 1 and the second antenna array 2 and a specific size of each component may be set based on an antenna pattern, a gain requirement, and a side lobe requirement of the array antenna in an actual application. This is not specifically limited either.

Figure 16:
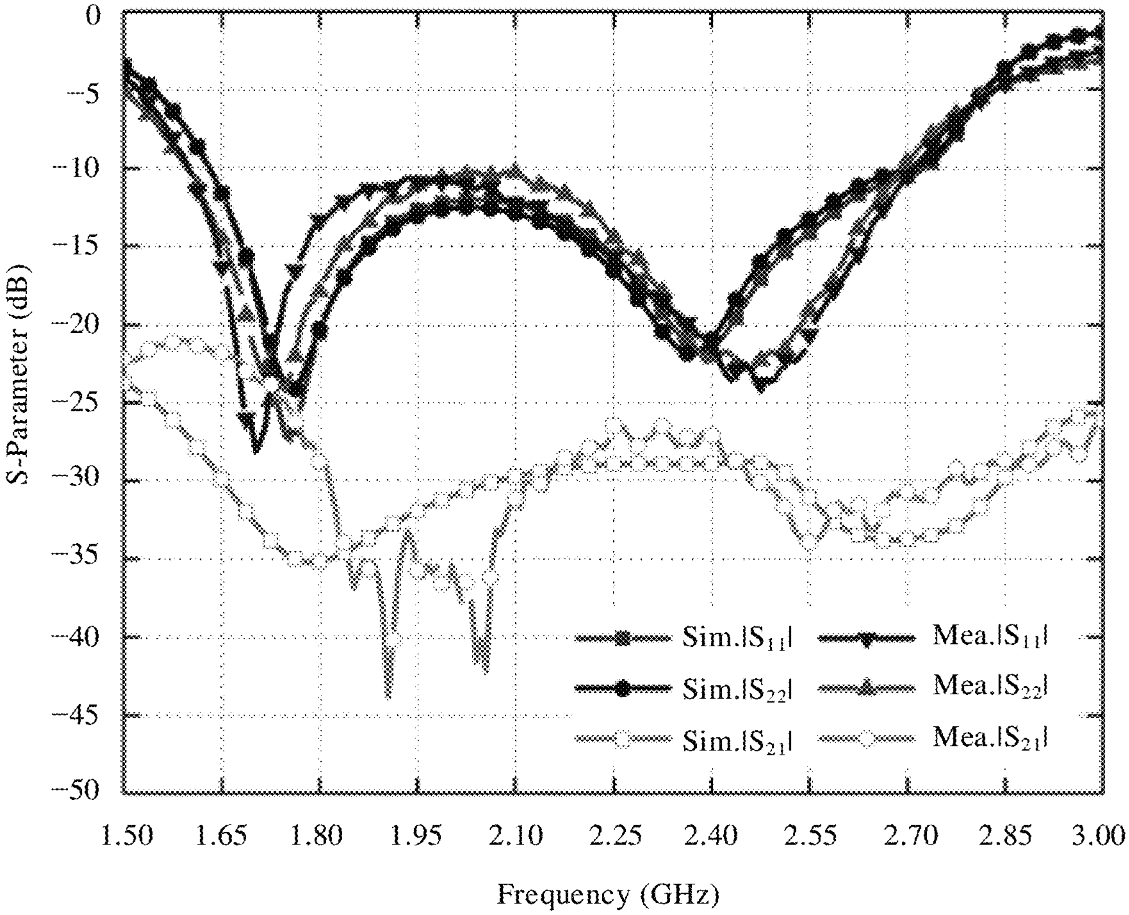
FIG. 16 shows a standing wave and isolation of a medium-frequency antenna array.
Figure 17:
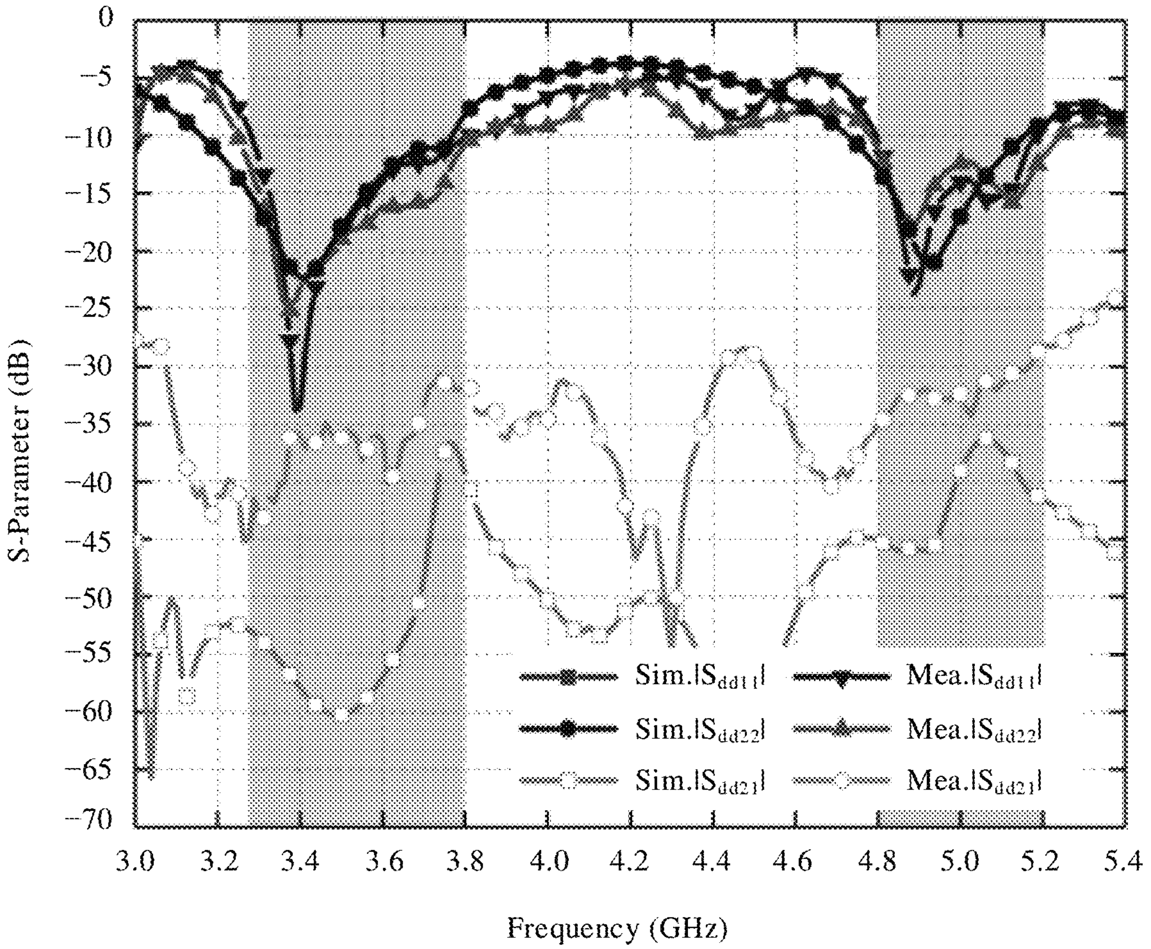
FIG. 17 shows a standing wave and isolation of a high-frequency antenna array.
Figure 18:
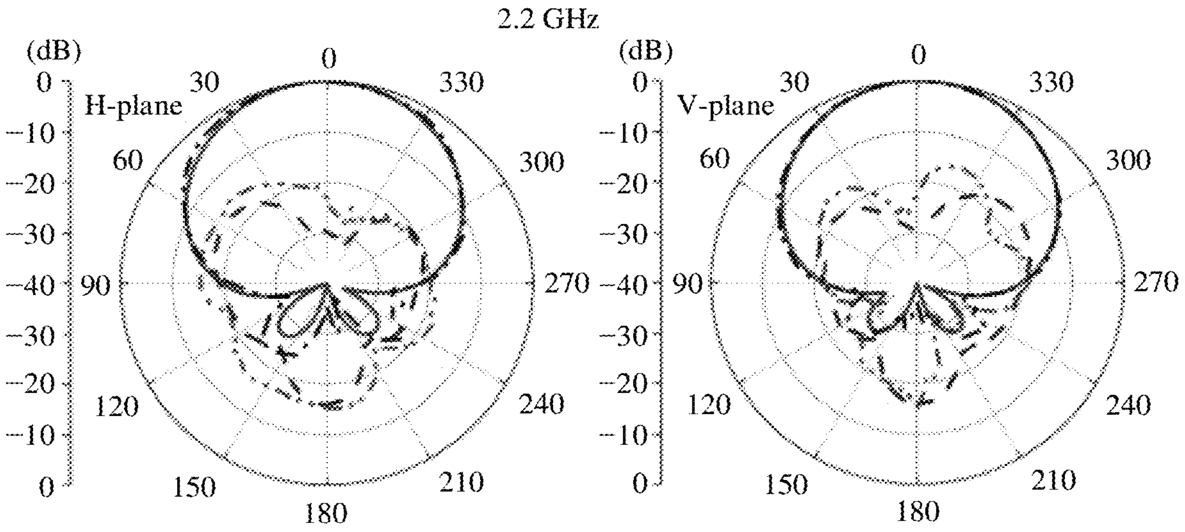
FIG. 18 to FIG. 20 respectively show H-plane and V-plane antenna patterns of an antenna array at 2.2 GHz, 3.6 GHz, and 5 GHz.
Figure 19:
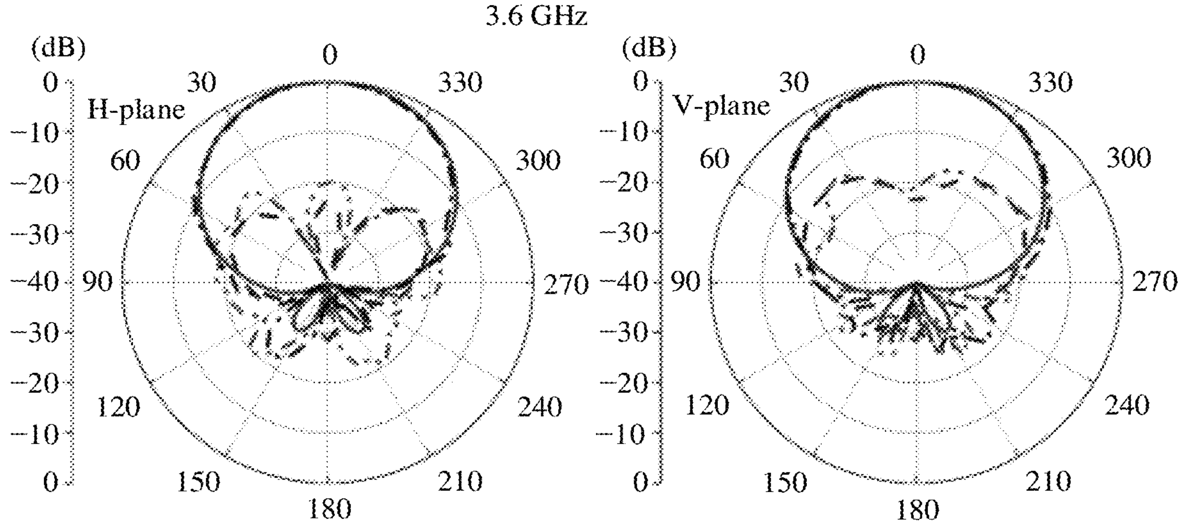
Figure 20:
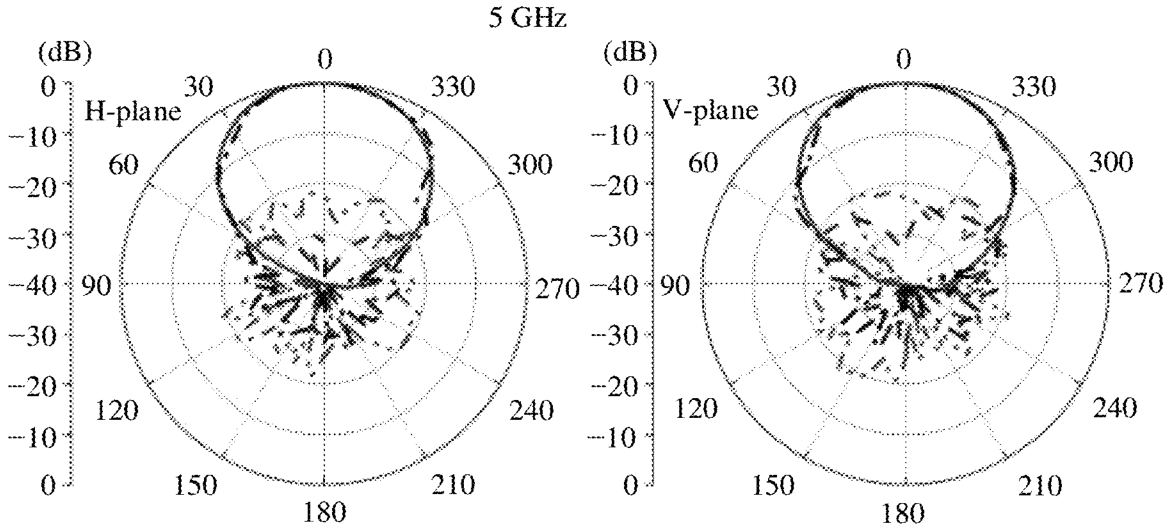
Figure 21:
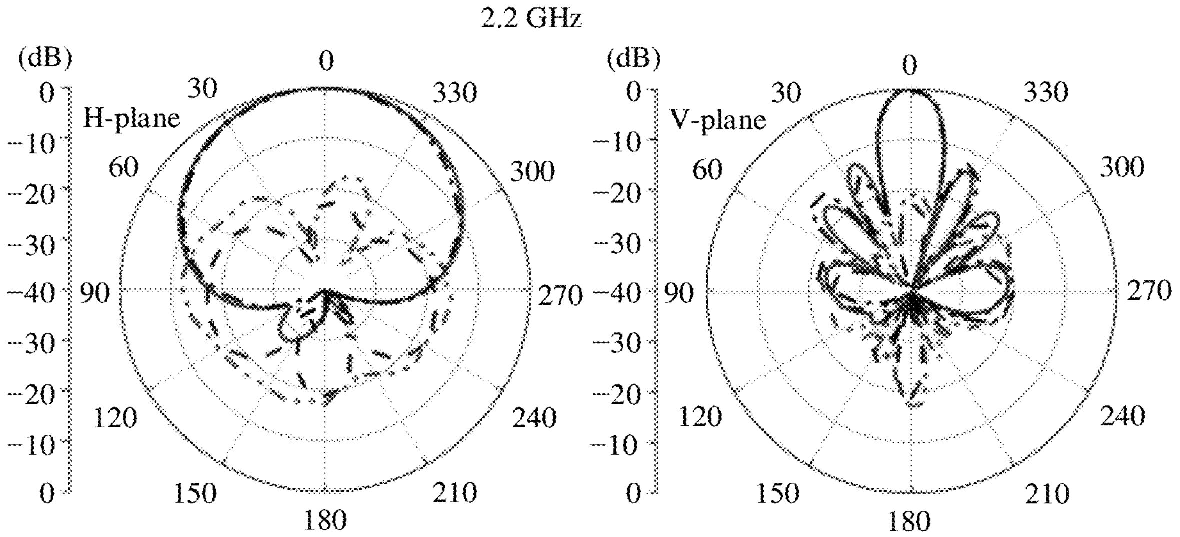
FIG. 21 to FIG. 23 respectively show H-plane and V-plane antenna patterns of an antenna array at 2.2 GHz, 3.6 GHz, and 5 GHz.
Figure 22:
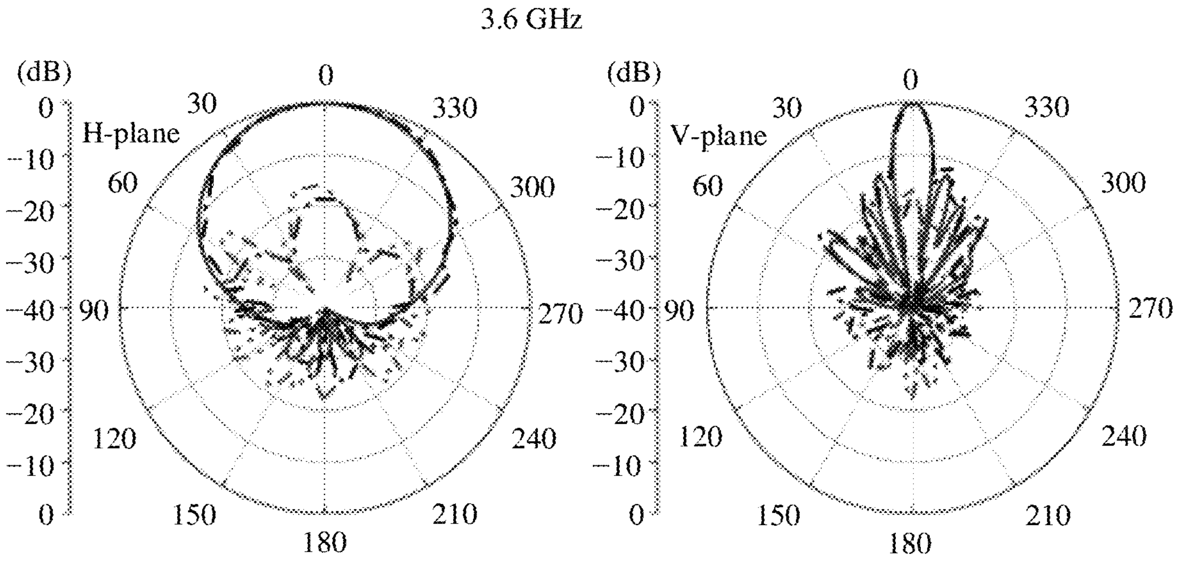
Figure 23:
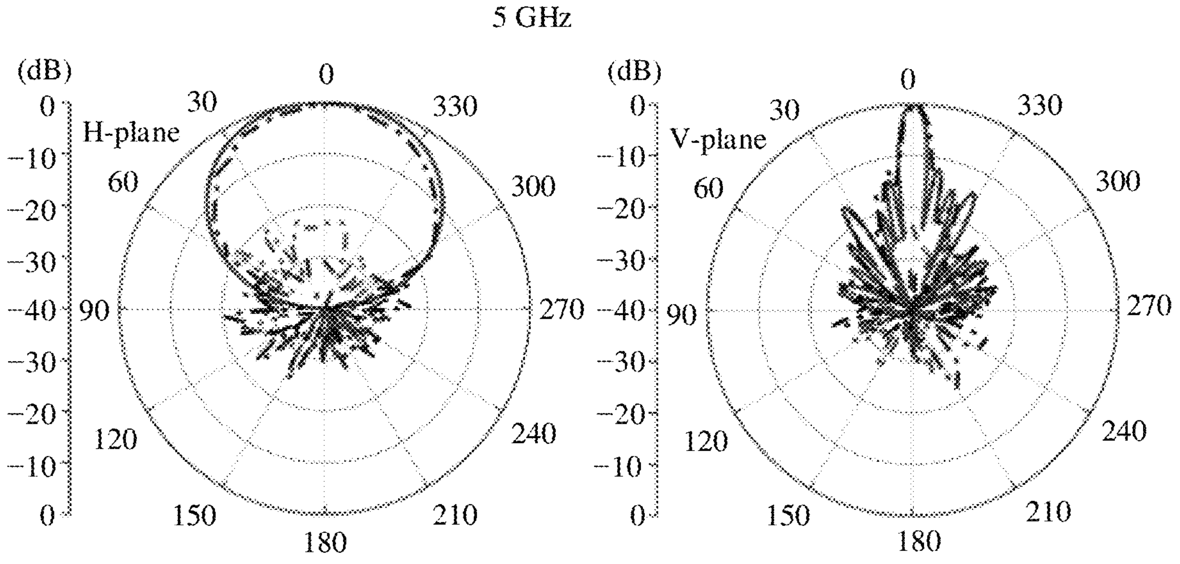

FIG. 16 shows a standing wave and isolation of a medium-frequency antenna array; and FIG. 17 shows a standing wave and isolation of a high-frequency antenna array. FIG. 18 to FIG. 20 respectively show H-plane and V-plane antenna patterns of an antenna array at 2.2 GHz, 3.6 GHz, and 5 GHz. FIG. 21, FIG. 22, and FIG. 23 respectively show H-plane and V-plane antenna patterns of an antenna array at 2.2 GHz, 3.6 GHz, and 5 GHz. In FIG. 18 to FIG. 23, a solid line represents a simulated main polarization antenna pattern, a single-dotted line represents a measured main polarization antenna pattern, a dotted line represents a simulated cross polarization antenna pattern, and a double-dotted line represents a measured cross polarization antenna pattern.

Figure 24:
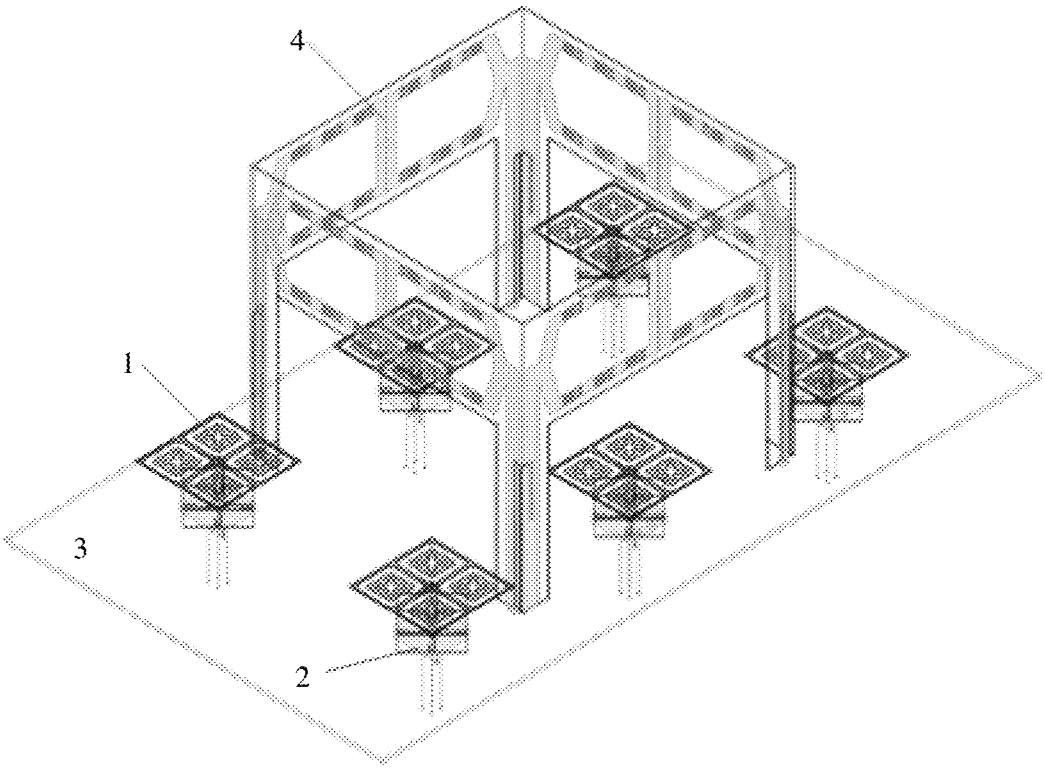
FIG. 24 is a schematic diagram of a structure of a multi-band shared-aperture antenna according to Embodiment 5 of this application.

FIG. 24 is a schematic diagram of a structure of a multi-band shared-aperture antenna according to Embodiment 5 of this application. As shown in FIG. 24, the antenna structure in this embodiment is similar to the antenna structure in Embodiment 4. A difference lies in that the antenna structure further includes a third antenna array 4. The third antenna array 4 is disposed above the reflection panel 3. A frequency band of the third antenna array 4 is lower than the frequency band of the first antenna array 1, and a highest part of the third antenna array 4 is higher than a highest part of the first antenna array 1. The third antenna array may use the structure of the first antenna array in Embodiment 1 to Embodiment 3. Details are not described herein again.

The shared-aperture antenna in this embodiment supports a high frequency band, a medium frequency band, and a low frequency band. The entire antenna uses a layered structure, a low-frequency antenna at an upper layer is similar to a first array antenna that covers the frequency band of 690 MHz to 960 MHz in Embodiments 1 to 3, and is embedded in a gap between a medium-frequency antenna (a first array antenna in Embodiment 4) and a high-frequency antenna (a second array antenna in Embodiment 4) array at lower layers by using a support structure. The low-frequency antenna uses a distributed capacitor-inductor wave transmission structure, to generate series resonance for a low-frequency signal to form a short circuit for normal operation, and to generate parallel resonance in a medium/high frequency band to form an open circuit, thereby implementing a wave transmission function required by the low-frequency antenna for a medium/high-frequency signal, freely radiating the medium/high-frequency signal, and minimizing an impact of the low-frequency antenna on an antenna pattern and a gain of the medium/high-frequency antenna. In addition, an ADS decoupling function of the low-frequency antenna at the upper layer can be used to uniformly decouple the medium-frequency antenna array and the high-frequency antenna array at the lower layers. This minimizes coupling between antenna units at the lower layers and avoids distortion of the antenna pattern. The medium-frequency array and the high-frequency array at the lower layers use an upper-lower layer coaxial structure. The medium-frequency antenna at an upper layer covers a frequency band of 1.71 GHz to 2.69 GHz, and the high-frequency antenna at a lower layer covers a frequency band of 3.3 GHz to 3.8 GHz. The high-frequency antenna is designed as an FSS, so that the high-frequency signal can be normally radiated. In this way, distortion that is of the antenna pattern of the high-frequency antenna and that is caused by the medium-frequency antenna is minimized. Finally, in an overall structure in which the low-frequency antenna and both of the medium-frequency antenna and the high-frequency antenna are embedded in layers, and the medium-frequency antenna and the high-frequency antenna are coaxially layered, a capacitor-inductor structure wave transmission technology, an ADS decoupling technology, and an FSS wave transmission technology are separately used to implement wave transmission and decoupling functions of the three-band shared-aperture array antenna, to obtain excellent antenna pattern performance and meet a gain requirement.

Figure 25:
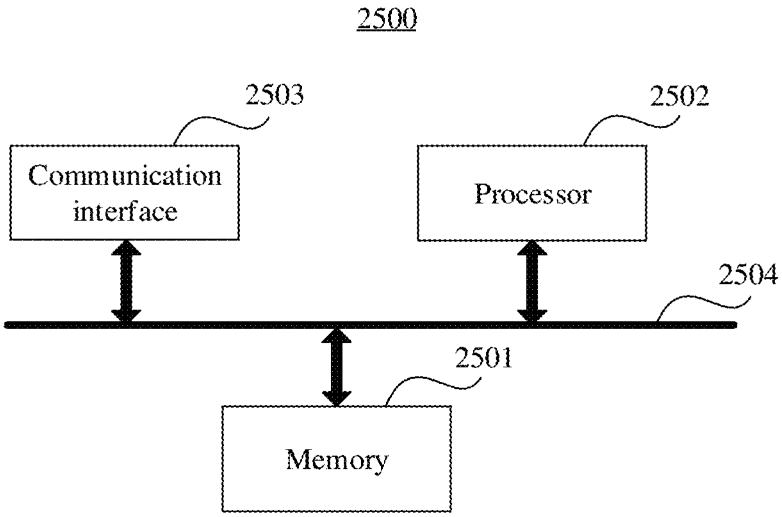
FIG. 25 is a schematic diagram of a structure of a communication device according to an embodiment of this application.

FIG. 25 is a schematic diagram of a structure of a communication device according to an embodiment of this application. As shown in FIG. 25, the communication device 2500 in this embodiment includes a processor 2502 and a communication interface 2503. The communication interface 2503 may include any one of the multi-band shared-aperture antennas in Embodiment 1 to Embodiment 5.

Further, the communication device 2500 may further include a memory 2501. Optionally, the communication device 2500 may further include a bus 2504. The communication interface 2503, the processor 2502, and the memory 2501 may be connected to each other by using the bus 2504. The bus 2504 may be a peripheral component interconnect (peripheral component interconnect, PCI) bus, an extended industry standard architecture (extended industry standard architecture, EISA) bus, or the like. The bus 2504 may be classified into an address bus, a data bus, a control bus, and the like. For ease of representation, only one bold line is used for representation in FIG. 25, but this does not mean that there is only one bus or only one type of bus.

The processor 2502 may perform various functions of the communication device 2500 by running or executing a program stored in the memory 2501.

For example, the communication device 2500 shown in FIG. 25 may be a cloud or a terminal in embodiments of this application.

When the communication device 2500 is a cloud, the processor 2502 may perform, by running or executing the program stored in the memory 2501, actions completed by the cloud in the foregoing method examples. When the communication device 2500 is a terminal, the processor 2502 may perform, by running or executing the program stored in the memory 2501, actions completed by the terminal in the foregoing method examples.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multi-band shared-aperture antenna, comprising:

a first antenna array;

a second antenna array; and a reflection panel, wherein both the first antenna array and the second antenna array are disposed above the reflection panel, a frequency band of the first antenna array is lower than a frequency band of the second antenna array, and a highest part of the first antenna array with respect to the reflection panel is higher than a highest part of the second antenna array with respect to the reflection panel;

wherein the first antenna array comprises four first dielectric plates, major surfaces of all of the four first dielectric plates are perpendicular to a major surface of the reflection panel, the four first dielectric plates continuously encircle a hollow space defined by the four first dielectric plates, and major surfaces of two adjacent first dielectric plates are perpendicular to each other;

wherein the first antenna array further comprises four hollowed butterfly dipole units, at least one of the four hollowed butterfly dipole units comprises two radiation arms, the two radiation arms are respectively printed on two adjacent first dielectric plates, an included angle between major axes of the two radiation arms is 90°, at least one of the radiation arms comprises a first part having a major axis that is perpendicular to the reflection panel and a second part having a major axis that is parallel to the reflection panel, the first part is connected to the second part, a first feeding stub is disposed at a position that is on at least one of the four first dielectric plates and on which the first part is printed, the first feeding stub and the first part are respectively located on two surfaces of the one of the first dielectric plates, the first feeding stub is electrically connected to the reflection panel, and the second part has a preset width in a direction perpendicular to the reflection panel; and wherein the second antenna array comprises a plurality of second dielectric plates, major surfaces of all of the second dielectric plates of the plurality of second dielectric plates are parallel to the reflection panel, four ring-shaped coils are disposed on a second dielectric plate of the plurality of second dielectric plates, at least one ring-shaped coil of the four ring-shaped coils is connected to a second feeding stub, and the second feeding stub is electrically connected to the reflection panel.

2. The antenna according to claim 1, wherein two dipole units of the four hollowed butterfly dipole units on a diagonal line in the first antenna array have a same polarization direction.

3. The antenna according to claim 2, wherein two adjacent dipole units of the four hollowed butterfly dipole units in the first antenna array form two polarization directions of ±45°.

4. The antenna according to claim 3, wherein the second part is an unclosed ring-shaped structure.

5. The antenna according to claim 4, wherein:

a lumped first resonant circuit is disposed on the second part; and the lumped first resonant circuit comprises two parallel slots disposed on the second part, a capacitor and an inductor disposed on one slot of the two parallel slots, and a capacitor disposed on the other slot of the two parallel slots.

6. The antenna according to claim 3, wherein:

a lumped first resonant circuit is disposed on the second part; and the lumped first resonant circuit comprises two parallel slots disposed on the second part, a capacitor and an inductor disposed on one slot of the two parallel slots, and a capacitor disposed on the other slot of the two parallel slots.

7. The antenna according to claim 1, wherein the second part is an unclosed ring-shaped structure.

8. The antenna according to claim 1, wherein:

a lumped first resonant circuit is disposed on the second part; and the lumped first resonant circuit comprises two parallel slots disposed on the second part, a capacitor and an inductor disposed on one slot of the two parallel slots, and a capacitor disposed on the other slot of the two parallel slots.

9. The antenna according to claim 1, wherein:

a distributed second resonant circuit is disposed on the second part; and the distributed second resonant circuit comprises an interdigital capacitor and an inductor, wherein the interdigital capacitor comprises two intersected comb-shaped microstrips, and the inductor comprises a bent microstrip.

10. A multi-band shared-aperture antenna, comprising:

a first antenna array;

a second antenna array; and a reflection panel, wherein both the first antenna array and the second antenna array are disposed above the reflection panel, a frequency band of the first antenna array is lower than a frequency band of the second antenna array, a highest part of the first antenna array with respect to the reflection panel is higher than a highest part of the second antenna array with respect to the reflection panel, and in a plan view of the reflection panel the second antenna array extends past each edge of the first antenna array;

wherein the first antenna array comprises four first dielectric plates, major surfaces of all of the four first dielectric plates are perpendicular to a major surface of the reflection panel, the four first dielectric plates continuously encircle a hollow space defined by the four first dielectric plates, and major surfaces of two adjacent first dielectric plates are perpendicular to each other;

wherein the first antenna array further comprises four hollowed butterfly dipole units, at least one of the four hollowed butterfly dipole units comprises two radiation arms, the two radiation arms are respectively printed on two adjacent first dielectric plates, an included angle between major axes of the two radiation arms is 90°, at least one of the radiation arms comprises a first part having a major axis that is perpendicular to the reflection panel and a second part having a major axis that is parallel to the reflection panel, the first part is connected to the second part, a first feeding stub is disposed at a position that is on at least one of the four first dielectric plates and on which the first part is printed, the first feeding stub and the first part are respectively located on two surfaces of the one of the first dielectric plates, the first feeding stub is electrically connected to the reflection panel, and the second part has a preset width in a direction perpendicular to the reflection panel; and wherein the second antenna array comprises a plurality of second dielectric plates, major surfaces of all of the second dielectric plates of the plurality of second dielectric plates are parallel to the reflection panel, four ring-shaped coils are disposed on a second dielectric plate of the plurality of second dielectric plates, at least one ring-shaped coil of the four ring-shaped coils is connected to a second feeding stub, and the second feeding stub is electrically connected to the reflection panel.

11. The antenna according to claim 10, wherein two dipole units of the four hollowed butterfly dipole units on a diagonal line in the first antenna array have a same polarization direction.

12. The antenna according to claim 11, wherein two adjacent dipole units of the four hollowed butterfly dipole units in the first antenna array form two polarization directions of ±45°.

13. The antenna according to claim 12, wherein the second part is an unclosed ring-shaped structure.

14. The antenna according to claim 13, wherein:

a lumped first resonant circuit is disposed on the second part; and the lumped first resonant circuit comprises two parallel slots disposed on the second part, a capacitor and an inductor disposed on one slot of the two parallel slots, and a capacitor disposed on the other slot of the two parallel slots.

15. The antenna according to claim 12, wherein:

a lumped first resonant circuit is disposed on the second part; and the lumped first resonant circuit comprises two parallel slots disposed on the second part, a capacitor and an inductor disposed on one slot of the two parallel slots, and a capacitor disposed on the other slot of the two parallel slots.

16. The antenna according to claim 10, wherein the second part is an unclosed ring-shaped structure.

17. A multi-band shared-aperture antenna, comprising:

a first antenna array;

a second antenna array; and a reflection panel, wherein both the first antenna array and the second antenna array are disposed above the reflection panel, a frequency band of the first antenna array is lower than a frequency band of the second antenna array, a highest part of the first antenna array with respect to the reflection panel is higher than a highest part of the second antenna array with respect to the reflection panel;

wherein the first antenna array comprises four first dielectric plates, major surfaces of all of the four first dielectric plates are perpendicular to a major surface of the reflection panel, the four first dielectric plates enclose a hollow space, and major surfaces of two adjacent first dielectric plates are perpendicular to each other;

wherein the first antenna array further comprises four hollowed butterfly dipole units, at least one of the four hollowed butterfly dipole units comprises two radiation arms, the two radiation arms are respectively printed on two adjacent first dielectric plates, an included angle between major axes of the two radiation arms is 90°, at least one of the radiation arms comprises a first part having a major axis that is perpendicular to the reflection panel and a second part having a major axis that is parallel to the reflection panel, the first part is connected to the second part, a first feeding stub is disposed at a position that is on at least one of the four first dielectric plates and on which the first part is printed, the first feeding stub and the first part are respectively located on two surfaces of the one of the first dielectric plates, the first feeding stub is electrically connected to the reflection panel, the second part has a preset width in a direction perpendicular to the reflection panel, a lumped first resonant circuit is disposed on the second part, the lumped first resonant circuit comprises two parallel slots disposed on the second part, a capacitor and an inductor disposed on one slot of the two parallel slots, and a capacitor disposed on the other slot of the two parallel slots; and wherein the second antenna array comprises a plurality of second dielectric plates, major surfaces of all of the second dielectric plates of the plurality of second dielectric plates are parallel to the reflection panel, four ring-shaped coils are disposed on a second dielectric plate of the plurality of second dielectric plates, at least one ring-shaped coil of the four ring-shaped coils is connected to a second feeding stub, and the second feeding stub is electrically connected to the reflection panel.

18. The antenna according to claim 17, wherein two dipole units of the four hollowed butterfly dipole units on a diagonal line in the first antenna array have a same polarization direction.

19. The antenna according to claim 17, wherein two adjacent dipole units of the four hollowed butterfly dipole units in the first antenna array form two polarization directions of ±45°.

20. The antenna according to claim 17, wherein the second part is an unclosed ring-shaped structure.

* * * * *